US012576911B2

(12) United States Patent　　(10) Patent No.:　US 12,576,911 B2

Müller et al.　　(45) Date of Patent:　Mar. 17, 2026

(54) STEERING DRIVE SYSTEM FOR A VEHICLE WITH WHEEL-BASED STEERING, VEHICLE WITH WHEEL-BASED STEERING AND METHOD FOR THE OPERATION THEREOF

(71) Applicant: RENK GMBH, Augsburg (DE)

(72) Inventors: Nikolaus Müller, Munich (DE); Marcel Pfänder, Munich (DE); Mario Harscher, Augsburg (DE)

(73) Assignee: RENK GmbH (DE)

( * ) Notice: Subject to any disclaimer, the term of this patent is extended or adjusted under 35 U.S.C. 154(b) by 443 days.

(21) Appl. No.: 18/552,002

(22) PCT Filed: Mar. 23, 2022

(86) PCT No.: PCT/EP2022/057663
§ 371 (c)(1),
(2) Date: Sep. 22, 2023

(87) PCT Pub. No.: WO2022/200449
PCT Pub. Date: Sep. 29, 2022

(65) Prior Publication Data
US 2024/0300577 A1　　Sep. 12, 2024

(30) Foreign Application Priority Data

Mar. 24, 2021　(DE) ..................... 10 2021 107 419.3

(51) Int. Cl.
*B62D 11/14*　　(2006.01)
(52) U.S. Cl.
CPC .................................... *B62D 11/14* (2013.01)
(58) Field of Classification Search
CPC ......... B62D 11/14; B62D 11/00; F16H 48/36; F16H 48/34; F16H 2048/362;
(Continued)

(56) References Cited

U.S. PATENT DOCUMENTS 4,895,052 A　*　1/1990　Gleasman ........... F16H 37/0806
180/6.44
4,960,404 A　　10/1990　Reppert et al.
(Continued)

FOREIGN PATENT DOCUMENTS

CN　　105501055 A　*　4/2016
DE　　3832529 A1　　3/1990
(Continued)

OTHER PUBLICATIONS

German Patent Office; Examination Report in related German Patent Application No. 10 2021 107 419.3 dated Oct. 12, 2021; 10 pages.

(Continued)

*Primary Examiner* — Paul N Dickson
*Assistant Examiner* — Matthew D Lee
(74) *Attorney, Agent, or Firm* — Dorton & Willis, LLP

(57)　　　　　ABSTRACT

A steering drive system for a wheel side steered vehicle includes a coupling element couplable to output drives of the vehicle in order, when an amount of a superposition rotational speed of the coupling element is greater than zero, to provide at the output drives, which are driven at a basic rotational speed on the basis of a travel drive system of the vehicle, for steering the vehicle a superposition rotational speed which is to be superposed on the basic rotational speed. The system further includes at least one first electric machine whose rotational speed can be variably set or controlled, with a power summation and/or power branching unit, wherein a first connection of the power summation and/or power branching unit is coupled to a shaft which can be coupled, in particular via a defined transmission ratio, to a shaft of the travel drive system. A second connection of the power summation and/or power branching unit is coupled to the at least one first electric machine, and a third connection (Continued)

of the power summation and/or power branching unit is coupled to the coupling element, in particular via at least one defined transmission ratio.

20 Claims, 11 Drawing Sheets

(58) Field of Classification Search
CPC ............ F16H 2048/368; B60K 6/445; B60W 2300/44; B60Y 2200/25; B60Y 2200/254
See application file for complete search history.

(56) References Cited

U.S. PATENT DOCUMENTS

| | | | | | |
|---|---|---|---|---|---|
| 5,101,919 | A * | 4/1992 | Ossi | ........................ | B62D 11/18 |
| | | | | | 180/6.7 |
| 2002/0166676 | A1 * | 11/2002 | Andriani | ................ | B62D 11/14 |
| | | | | | 172/2 |
| 2004/0116228 | A1 * | 6/2004 | Thompson | ............. | B62D 11/16 |
| | | | | | 475/19 |
| 2004/0121871 | A1 * | 6/2004 | Thompson | ............. | B62D 11/14 |
| | | | | | 475/83 |
| 2005/0187067 | A1 * | 8/2005 | Dobereiner | ........... | B60K 6/547 |
| | | | | | 477/5 |
| 2006/0019787 | A1 * | 1/2006 | Witzenberger | ........ | B62D 11/18 |
| | | | | | 475/18 |
| 2007/0102209 | A1 * | 5/2007 | Doebereiner | .......... | B60K 6/445 |
| | | | | | 180/6.7 |
| 2012/0205167 | A1 * | 8/2012 | Karrie | ................... | B62D 11/16 |
| | | | | | 180/6.48 |
| 2012/0283061 | A1 * | 11/2012 | Karlsson | ................ | H02K 7/006 |
| | | | | | 475/150 |
| 2016/0272241 | A1 * | 9/2016 | Sonnenburg | ........... | B62D 55/06 |
| 2024/0300577 | A1 * | 9/2024 | Mueller | ................. | B60K 6/365 |

FOREIGN PATENT DOCUMENTS

| | | | | | |
|---|---|---|---|---|---|
| DE | 4313378 | A1 | 10/1994 | | |
| DE | 10246870 | B3 | 4/2004 | | |
| DE | 10314956 | A1 * | 11/2004 | ............. | E03F 5/041 |
| DE | 10314956 | B4 | 11/2004 | | |
| DE | 102005035824 | A1 | 2/2007 | | |
| DE | 102009016639 | A1 | 10/2010 | | |
| DE | 102013204672 | A1 | 9/2014 | | |
| DE | 102020204217 | A1 * | 11/2020 | ............ | B60K 6/387 |
| DE | 102020206208 | A1 * | 11/2021 | ............ | B60K 6/365 |
| DE | 102024205511 | B3 * | 10/2025 | ............ | B60K 17/04 |
| EP | 1650109 | A1 | 4/2006 | | |
| KR | 102802000 | B1 * | 5/2025 | .......... | B62D 11/001 |

OTHER PUBLICATIONS

European Patent Office; Search Report in related International Patent Application No. PCT/EP2022/057663 dated Aug. 4, 2022; 18 pages.

Intellectual Property Office of Singapore; Search Report n related Singapore Patent Application No. 11202307131V dated Sep. 6, 2024; 2 pages.

Intellectual Property Office of Singapore; Written Opinion in related Singapore Patent Application No. 11202307131V dated Sep. 9, 2024; 5 pages.

\* cited by examiner

STEERING DRIVE SYSTEM FOR A VEHICLE WITH WHEEL-BASED STEERING, VEHICLE WITH WHEEL-BASED STEERING AND METHOD FOR THE OPERATION THEREOF

CROSS-REFERENCE TO RELATED APPLICATIONS

This application is a national phase application under 35 U.S.C. § 371 of International Patent Application No. PCT/EP2022/057663, filed Mar. 23, 2022 (pending), which claims the benefit of priority to German Patent Application No. DE 10 2021 107 419.3, filed Mar. 24, 2021, the disclosures of which are incorporated by reference herein in their entirety.

TECHNICAL FIELD

The disclosure relates to a steering drive system for a wheel side steered vehicle, in particular a wheel side steered vehicle. Furthermore, the invention relates to a wheel side steered vehicle and a method for operating the same.

BACKGROUND

A wheel side steered vehicle, such as a tracked vehicle, has a travel drive system as well as a steering drive system.

The travel drive system of a wheel side steered vehicle has at least one drive unit and a driving gearbox to provide drive power and a base speed at output drives of the wheel side steered vehicle, which are positioned on both sides of the vehicle, in particular for straight-ahead travel of the wheel side steered vehicle.

In dynamic wheel side steered vehicles, superimposed steering is typically used in which a respective wheel side of the wheel side steered vehicle is driven crosswise at a superposition rotational speed to effect a steering movement via a differential torque. Preferably, the superpositions are connected crosswise via a coupling element or member to recover steering energy from the translational motion of the vehicle. This coupling element or link can be designed as a so-called zero shaft, which is stationary when the vehicle is traveling straight ahead and alternately superimposes both wheel sides during steering movements.

To steer a wheel side steered vehicle with zero shaft, the zero shaft must rotate. The zero shaft can then be used to superimpose a superposition rotational speed on the output drives of the output drives, which increases the basic rotational speed on a first side of the wheel side steered vehicle and reduces the basic rotational speed on an opposite second side of the wheel side steered vehicle. This then may allow to steer the wheel side steered vehicle.

DE 10 2009 016 639 A1 describes a steering drive system for a wheel side steered vehicle and a wheel side steered vehicle equipped with the steering drive system. Drives are shown which drive into a summation gearbox. The summation gearbox is operatively connected to a zero shaft via a spur gear stage. The zero shaft provides the respective superposition rotational speed for the two sides of the wheel side steered vehicle, which is superimposed on a basic rotational speed for steering provided by a drive unit.

DE 102 76 870 B3 describes another wheel side steered vehicle with a steering drive system. The zero shaft of the steering drive system can be driven by a combination of a power portion branched off from a travel drive system and a power portion of at least one electric motor, the electric motor being configured with several circuits independent of one another. A hydrodynamic steering clutch or a mechanically controllable powershift clutch is used to transmit the power portion branched off from the travel drive system.

Other wheel side steered vehicles are known from DE 10 2005 035 824 A1 and DE 103 14 956 B4.

There is a need for a steering drive system for a wheel side steered vehicle which has a simple design and/or enables reliable operation of the wheel side steered vehicle.

Furthermore, there is a need for a wheel side steered vehicle with such a steering drive system as well as a method for operating the wheel side steered vehicle.

SUMMARY

Based on this, the present invention is based on the task of creating a novel steering drive system for a wheel side steered vehicle or a wheel side steered vehicle, a wheel side steered vehicle with such a steering drive system and a method for operating the same.

This task is solved in particular by a steering drive system, a wheel side steered vehicle, and a method as disclosed herein.

The steering drive system according to the disclosure comprises a coupling element which can be coupled, in one embodiment is coupled, to output drives of the vehicle in order to provide, when an amount of a superposition rotational speed of the coupling element is greater than zero, a superposition rotational speed to be superposed on the basic rotational speed at the output drives, which are driven at a basic rotational speed starting from an output drive system of the vehicle, for steering the vehicle. Coupling element and coupling member are preferably synonymous.

The steering drive system according to the disclosure further comprises at least a first electric machine, the speed of which is variably adjustable or controllable, and a power summation unit and/or power branching unit.

A first connection of the power summation unit and/or power branching unit, in particular a single- or multi-strand connection, which in one embodiment forms a (first) input of the power summation unit and/or power branching unit, is coupled to a shaft which, in one embodiment, can be coupled, in one embodiment is coupled, to a shaft of the travel drive system via a defined transmission ratio. In one embodiment, the defined transmission ratio is provided by a main power distribution unit, in a further embodiment by a main power distribution unit, which is configured to direct a drive power, in particular at least temporarily wholly or partly, into the driving gearbox and/or, in particular at least temporarily wholly or partly, into the steering drive system, or which directs a drive power, in an embodiment as mentioned. In one embodiment, the shaft of the steering drive system is couplable to the shaft of the traction drive system via a or the main power distribution unit of the driving gearbox, in one embodiment is coupled. The main power distribution unit may in particular be arranged on a shaft on which the superimposed gears of the output drives are arranged and/or mounted. In particular, the steering drive system may be arranged to receive power via a primary power input.

In a further embodiment, the steering drive system receives power via a primary power input or is configured for this purpose. The primary power input can in particular receive a power, in particular at least a part of a power of a further electric machine and/or a drive unit and deliver a corresponding power to the steering drive system or be configured for this purpose. The power of the drive unit and/or this further electric machine can in particular be branched to the driving gearbox, in particular via a starting element, and to the primary power input via a or the main power distribution unit. In one embodiment, the drive unit comprises, and can in particular be, an internal combustion engine.

A second connection of the power summation unit and/or power branching unit, in particular a single- or multiple-strand connection, which in one embodiment forms a (second), preferably variable, input of the power summation unit and/or power branching unit, is, in one embodiment, directly or in one embodiment directly or at the same speed or in another embodiment via a (if applicable further) defined transmission ratio, to the at least one first electric machine, this transmission ratio preferably being not equal to one (and not equal to zero).

A third connection of the power summation unit and/or power branching unit, in particular of one or more members, in one embodiment of one or more strands, which in one embodiment forms an output of the power summation unit and/or power branching unit, is coupled to the coupling element, in one embodiment via at least one (if applicable further) defined transmission ratio, in a further embodiment alternatively in each case via one of a plurality of different, in particular opposite, (further) defined transmission ratios.

The steering drive system according to the disclosure comprises the power summation and/or power branching unit, the first connection of which is coupled to that shaft which is coupled, in particular via a defined transmission ratio, to a shaft of the travel drive system or is configured for this purpose, the second connection of which is coupled to the at least one first electrical machine, and the third connection of which is coupled to the coupling element, in particular via a further defined transmission ratio, if applicable alternatively via one of a plurality of different further defined transmission ratios.

In one embodiment, the speed of the at least one first electrical machine can be precisely controlled. By this control, the transfer function for the steering can be selected. Thus, advantageously, a low-loss, stepless steering can be provided, preferably over the entire steering and driving range. In one embodiment, no mechanical forces are required to control the superposition rotational speed. In one embodiment, a preferably completely mechanically decoupled control concept in the sense of a "steer-by-wire concept" can be provided.

According to a further embodiment, at least one second electric machine is coupled to that shaft to which the first connection of the power summation unit and/or power branching unit is coupled, in one embodiment directly or at the same speed or, in another embodiment, via a defined transmission ratio which is preferably not equal to one (and not equal to zero). Via the at least one second electric machine coupled to the shaft to which the first connection of the power summation unit and/or power branching unit is coupled, a steering drive system can be provided which operates independently of a secondary energy source, in particular a traction battery on the vehicle or a second power generator.

In one embodiment, the steering drive system comprises at least one electric machine which is (at least temporarily operated as a generator or as a generator or) in a generator mode (and thereby) supplies the at least one first electric machine, in one embodiment operated as a motor or as a motor or in a motor mode, with electric energy, in one embodiment directly or via an energy storage, and/or is (at least temporarily operated as a motor or as a motor or) in a motor mode (and thereby) supplied with electric energy by the at least one first electrical machine, in one embodiment generatively or operated as a generator or in a generator mode, in one embodiment directly or via an energy storage device, or which is configured for this purpose and which, in one embodiment, can be a second electrical machine as described herein, which is coupled to the coupling element or to that shaft to which the first connection of the power summation unit and/or power branching unit is also coupled, a further electrical machine as described herein, which, in one embodiment, is coupled to the shaft of the travel drive system, or also another electrical machine.

In one embodiment, this means that kinetic energy of the vehicle can be used advantageously and/or an electrical energy storage unit, in particular a (vehicle-side) traction battery, for supplying the first electrical machine can be reduced or saved.

In one embodiment, at least one second electric machine as described herein is arranged at an outer end of that shaft to which the first connection of the power summation unit and/or power branching unit is also coupled, or arranged at an outer end of the coupling element. In one embodiment, this can improve its accessibility, in particular for maintenance purposes. Additionally or alternatively, in one embodiment the at least one first electric machine and at least one second electric machine as described herein, which is coupled to the shaft to which the first connection of the power summation and/or power branching unit is also coupled, are arranged coaxially with respect to each other and/or on opposite sides of the power summation and/or power branching unit. In one embodiment, this can improve installation space, accessibility, in particular maintainability, and/or power transmission.

According to a further embodiment, a power unit is connected in parallel with the power summation unit and/or power branching unit, which power unit is designed to couple the shaft, to which the first connection of the power summation unit and/or power branching unit is also coupled, in parallel with the power summation unit and/or power branching unit, in particular slip-coupled, to the coupling element. In particular, if the power summation unit and/or power branching unit connected in parallel to the power summation unit and/or power branching unit is provided by a hydrodynamic coupling, a high power density can be provided by this further embodiment.

In one embodiment, this power unit is configured to couple the shaft, to which the first connection of the power summation unit and/or power branching unit is also coupled, to the coupling element in parallel with the power summation unit and/or power branching unit in one operating state of the power unit with one direction of rotation and in another operating state of the power unit with an opposite or reversed direction of rotation thereto.

For this purpose, in one embodiment, a rotation direction reversing unit is provided which, in a further embodiment, comprises at least one gear wheel track which is coupled to the coupling element and which, in one operating state of the power unit and/or in one operating state of the rotation direction reversing unit is driven by the shaft (to which the first connection of the power summation unit and/or power branching unit is also coupled) and rotates the coupling element with one direction of rotation, and in the other operating state of the power unit or in another operating state of the rotation direction reversing unit is driven by the shaft and rotates the coupling element with a direction of rotation opposite to or reversed from this aforementioned direction of rotation, or is configured for this purpose, and, in another further embodiment, comprises at least two gear wheel tracks which can be coupled, in particular are coupled, to the coupling element of which, in the one operating state of the power unit or in an operating state of the rotation direction reversing unit, the one gear wheel track couples the shaft, to which the first connection of the power summation unit and/or power branching unit is also coupled, to the coupling element with a direction of rotation and in the other operating state of the power unit or in another operating state of the rotation direction reversing unit, the other gear wheel track couples the shaft, to which the first connection of the power summation unit and/or power branching unit is also coupled, to the coupling element with a direction of rotation opposite thereto or are configured thereto.

According to a further embodiment, in one embodiment a power unit is arranged or provided between the first electrical machine and the second connection of the power summation unit and/or power branching unit, which power unit is configured to couple the shaft, to which the first connection of the power summation unit and/or power branching unit is also coupled, in parallel with the first electrical machine, in particular slip-coupled, to the power summation unit and/or power branching unit, in one embodiment to its second or variable connection. In this way, similar advantages may be achieved with a (more) compact design as with a power unit connected in parallel to the power summation and/or power branching unit.

In one embodiment, a power unit as described herein has a switchable friction clutch, in particular a multi-plate or hydrodynamic clutch. In one embodiment, this can transmit power in a particularly advantageous manner.

In one embodiment, the power unit transmits at least 50 percent of a power transmitted, in particular via the primary power input, into the steering drive system, further in particular at least 60 percent or at least 70 percent and/or at most 90 percent, in particular at most 80 percent, at most 75 percent or at most 70 percent, of the power, in particular directly, to the coupling element, and the power summation and/or power branching unit transmits (at least substantially) the remainder to the coupling element, in particular through a third connection of the power summation and/or power branching unit. Through this, in one embodiment, the first electric machine, in particular also the second electric machine, can be configured to be smaller, in particular smaller, than, in particular, an electric machine that supplements or reduces the total power introduced into the steering drive system, in particular in a (re)generative or motor operation of the (first or second) electric machine. In one embodiment, this allows fine adjustment of the speed of the coupling element, in particular via the first electric machine.

According to a further embodiment, the power summation unit and/or power branching unit is configured to couple, in at least a first operating state thereof, the first connection and the second connection to the third connection in a superposition mode, and is configured, in an embodiment, to couple, in at least a second operating state thereof, the first connection and/or the second connection to the third connection in a fixed ratio mode, preferably both, in a fixed ratio mode. By selecting the operating state of the power summation unit and/or power branching unit, in combination in one embodiment with the speed control of the at least one first electric machine, low-loss and/or stepless steering, preferably over the entire steering and driving range, can be provided in a particularly advantageous manner.

In one embodiment, the power summation unit and/or power branching unit is configured to couple, in a first operating state thereof, the first connection and the second connection to the third connection in a (first) superposition operation, in which a speed of the third connection can be varied by varying the speed of the second connection while the speed of the first connection remains the same, which is therefore also referred to as a variable input.

In a further embodiment, the power summation unit and/or power branching unit is configured to couple the first connection and the second connection to the third connection in at least one further superposition operation, in which a rotational speed of the third connection can be varied by varying the rotational speed of the second connection while the rotational speed of the first connection is the same, such that a rotational speed of the first connection that is the same in the first and further superposition modes and a rotational speed of the second connection that is the same in the first and further superposition modes cause different rotational speeds, in one embodiment rotational speeds with different amounts, of the third connection in the first and further superposition modes.

In one embodiment, the power summation unit and/or power branching unit is configured, in a second operating state in a (first) fixed transmission ratio operation, to couple the first connection to the third connection at a (first) fixed transmission ratio and/or couple the second connection to the third connection at a (second) fixed transmission ratio.

In a further embodiment, the power summation unit and/or power branching unit is configured to couple, in at least one further fixed transmission ration operation, the first connection to the third connection at a further fixed transmission ratio different, in one embodiment in amount, from the first fixed transmission ratio and/or to couple the second connection to the third connection at a further fixed transmission ratio different, in one embodiment in amount, from the second fixed transmission ratio.

In one embodiment, fixed ratio operation comprises or describes the case where the second connection can be or is load-free or can stand still or is standing still, in particular can be or is fixed, so that a fixed transmission ratio is or can be set between the first connection and the third connection.

If, for example, as will be discussed below, switching element 68 is closed in FIG. 4 or switching element 80 is closed in FIG. 5 or switching element 97 is closed in FIG. 6, this may (also) refer to as fixed ratio operation in one embodiment in which (also) the second connection 25b is coupled to the third connection 25c in a fixed ratio operation and/or in a fixed transmission ratio.

In one embodiment, the power summation unit and/or power branching unit is configured to couple the first connection, in particular at least when the second connection is load-free, to the third connection in at least one, preferably aforementioned second, operating state in a fixed transmission ratio and/or in such a way that a rotation of the first connection at a non-zero rotational speed when the second connection is load-free is translated into a rotation of the third connection at a non-zero rotational speed determined by this fixed transmission ratio. In this way, in one embodiment, a fixed transmission ratio can be set between the first and third connections so that power is provided purely via the first connection and the second connection is load-free or there is no longer any superimposition, which can be used advantageously, for example, as an emergency mode if the first electrical machine fails, and/or in order to set fixed steering radii and thus, in one embodiment, to protect the first electrical machine.

In one embodiment, the power summation and/or power branching unit has a reversing gear which is designed to reverse a direction of rotation of the coupling element, in particular to bring about opposite directions of rotation of the coupling element, depending on the operating state of the reversing gear, in the case of the same direction of rotation of a or the shaft to which the first connection of the power summation and/or power branching unit is also coupled.

In a further embodiment, this reversing gear is integrated into the power summation and/or power branching unit and, in one embodiment, at least one gear wheel track is provided which is coupled to the coupling element and the power summation and/or power branching unit, in particular its third connection and/or integrated reversing gear, and which, in one operating state of the reversing gear, rotates in one direction of rotation and, in the other operating state of the reversing gear, rotates in a direction of rotation opposite thereto or in the opposite direction of rotation and/or which connects the third connection, in one embodiment via an or the (further) defined transmission ratio, to the coupling element or is designed for this purpose.

In another further embodiment, the reversing gear is connected between the power summation unit and/or power branching unit and the coupling element and has at least two gear wheel tracks coupled to the coupling element, of which, in one operating state of the reversing gear, the one gear wheel track drives the coupling element through the power summation unit and/or power branching unit with a direction of rotation and in another operating state of the reversing gear the other gear wheel track drives the coupling element through the power summation unit and/or power branching unit with a direction of rotation opposite or reversed to this aforementioned direction of rotation, which are configured for this purpose, respectively. In one embodiment, the two gear wheel tracks alternatively couple the power summation unit and/or power branching unit, preferably the third connection thereof, to the coupling element and with opposite directions of rotation, or are configured to do so.

In one embodiment, the connection to the coupling element can be simplified by the integrated reversing gear, and in one embodiment, the power summation unit and/or power branching unit can be made (more) compact by the intermediate reversing gear with at least two alternatively driving gear wheel tracks.

In one embodiment, the reversing gear is arranged after superposition of the power provided by the shaft to which the first connection of the power summation unit and/or power branching unit is coupled, in particular from the first connection, with the power provided by the at least one first electric machine, in particular from the second connection, in one embodiment integrated into the power summation unit and/or power branching unit.

By arranging the reversing gear after superimposing or power branching power from the travel drive system or power unit with power from the at least one first electric machine, in particular after power summation of power applied to the first connection and power applied to the second connection of the power summation unit and/or power branching unit, in one embodiment the operation of the electric machine can be improved, in particular, in that it can be operated, in particular is operated, in the same direction for both steering directions, and/or a reversal of the direction of rotation, in particular a jump in speed, can be reduced, preferably—at least substantially-avoided, when the power from the travel drive system or drive unit is switched on, for example if, in one embodiment, the coupling element is initially driven only by power from the first electric machine and power from the travel drive system or drive unit is later superimposed. In an embodiment with an arrangement of the reversing gear after the superposition or power summation, a switching operation of the power summation unit and/or power branching unit is advantageously possible without resynchronization of the first electric machine, or a resynchronization of the first electric machine can (thereby) advantageously be dispensed with. In one embodiment, this contributes significantly to a more controllable steerability of the vehicle.

In an embodiment with an arrangement of the reversing gear after superposition or power summation, in particular of power from the travel drive system and/or power branching unit with power from the at least one first electric machine, the switching elements of the reversing gear, in particular all switching elements which normally transmit drive power from the power summation unit and/or power branching unit in a respective opposite direction of rotation to the coupling element, can be closed simultaneously or are closed simultaneously. This may, in one embodiment, allow the entire reversing gear and, in one embodiment, thus also the coupling element to be braked to zero by the locking of both opposite directions of rotation. In one embodiment, this can advantageously enable a (more) controlled and (more) precise straight-ahead driving of the vehicle.

In one embodiment, the power summation unit and/or power branching unit of the steering drive system according to the disclosure, in particular of a steering drive system described herein, comprises one or more, preferably at least and/or at most four, in particular at most six, planetary sets and/or one or more, preferably at least and/or at most three, in particular at most five, switching elements, wherein in one embodiment at least two planetary sets and at least two switching elements form the reversing gear integrated in the power summation unit and/or power branching unit, and/or and wherein at least two (optionally further) planetary sets and at least one (optionally further) switching element are involved in providing the different operating states of the power summation unit and/or power branching unit depending on the switching position of the switching element(s).

In a further embodiment, one or more switching elements, preferably all switching elements, are configured as a brake.

In a further embodiment, one or more switching elements, in particular all switching elements, are configured as a clutch.

In a further embodiment, two switching elements, preferably alternatively activated or locked, are designed to alternatively activate or turn one of the two gear wheel tracks of the rotation direction reversing unit. Additionally or alternatively, in a further embodiment, two switching elements of the reversing gear connected between power summation unit and/or power branching unit and coupling element, which are preferably alternatively activated or blocked, are designed to alternatively activate or rotate one of the two gear wheel tracks. These switching elements can each be part of the rotation direction reversing unit or the reversing gear.

One or more transmission ratios mentioned herein can in one embodiment (respectively) always be non-zero and/or unequal to one, in particular in order to be able to operate the two coupled partners (more) advantageously in each case, in particular in advantageous speed ranges. In one embodiment, a fixed transmission ratio can also be equal to zero or include or describe the case where the second connection of the power summation unit and/or power branching unit can be stationary, in particular is stationary.

Examples of embodiments of the invention are explained in more detail by way of the drawings, without being limited to the latter.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

The invention relates to a steering drive system for a wheel side steered vehicle or a wheel side steered vehicle, a wheel side steered vehicle with such a steering drive system and a travel drive system as well as a method for operating a wheel side steered vehicle with such a steering drive system.

Figure 1:
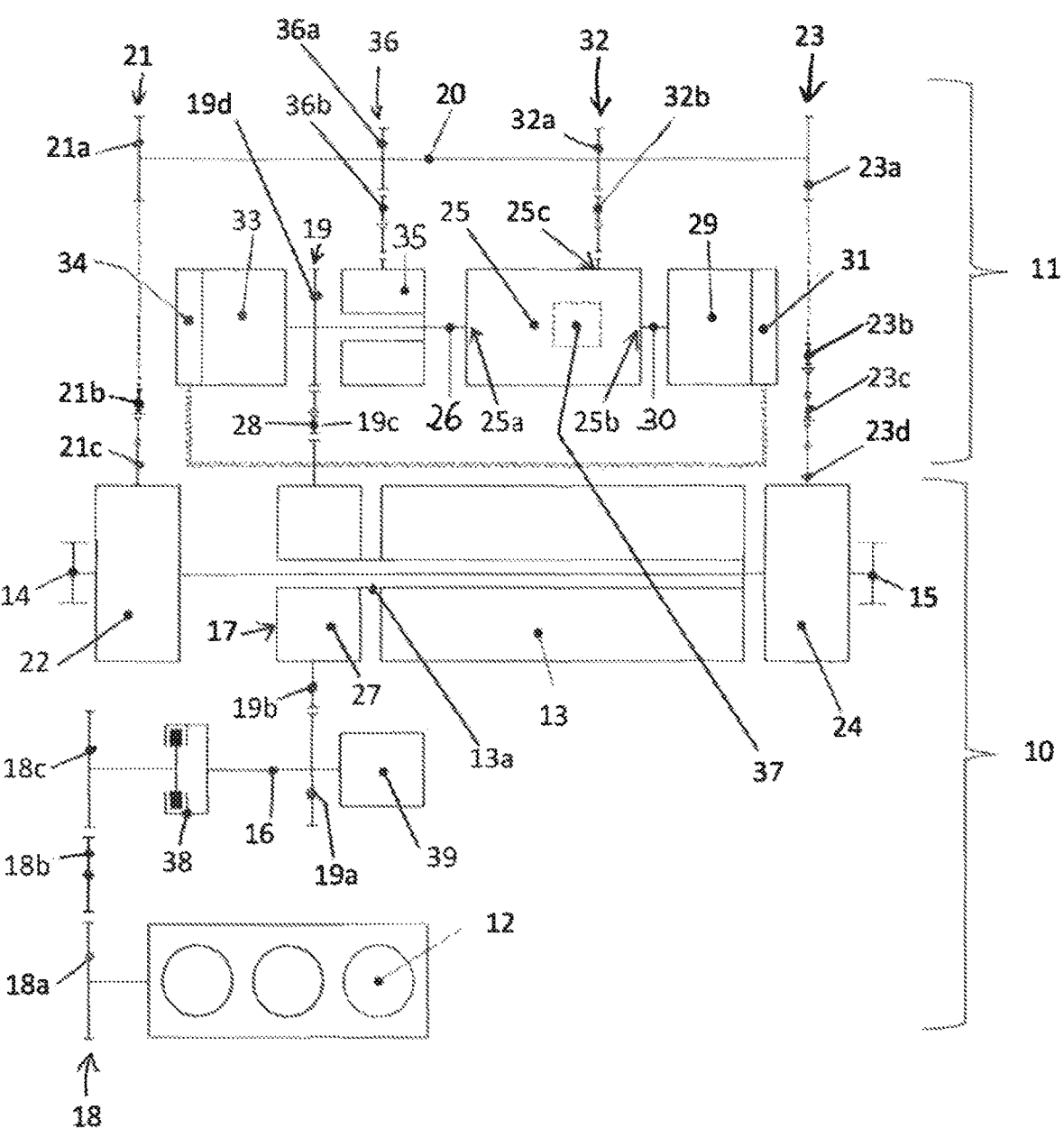
FIG. 1 is a schematic representation of a steering drive system for a wheel side steered vehicle together with a travel drive system of the wheel side steered vehicle.

FIG. 1 shows a schematic powertrain diagram of a wheel side steered vehicle, namely assemblies of a travel drive system 10 and a steering drive system 11 of the wheel side steered vehicle.

The travel drive system 10 has at least one drive unit 12, which may be in the form of an internal combustion engine. The at least one drive unit 12 is also referred to as a primary drive unit.

The travel drive system 10 further comprises a driving gearbox 13 for providing drive power for a travel of the wheel side steered vehicle, which is provided by the at least one drive unit 12, to output drives 14, 15 of the wheel side steered vehicle. The output drive 14 is a first or left output drive and the output drive 15 is a second or right output drive of the wheel side steered vehicle, in particular chain output drives.

According to FIG. 1, the drive power provided by the at least one drive unit 12 of the travel drive system 10 can be transmitted via a shaft 16 and a main power distribution unit 17 of the travel drive system 10 on the one hand to the driving gearbox 13 of the travel drive system 10 and on the other hand to the steering drive system 11. This shaft 16 is operatively connected on the one hand to the drive unit 12 via a spur gear stage 18, which comprises the gears 18a, 18b, 18c, and on the other hand to the main power distribution unit 17 via a further spur gear stage 19, which comprises the gears 19a, 19b, 19c, 19d. The number of gears 18a to 18c and 19a to 19d shown in each case is purely exemplary.

Drive power provided by the at least one drive unit 12 and transmitted via the shaft 16 and the two spur gear stages 18, 19 to the main power distribution unit 17 is fed from the main power distribution unit 17 partly to the driving gearbox 13 of the travel drive system 10 and partly to the steering drive system 11.

Via the power path of the travel drive system 10, i.e. via the driving gearbox 13, a basic speed can be provided at the output drives 14, 15, which serves to propel the wheel side steered vehicle, in particular when driving straight ahead.

The steering drive system 11 of the wheel side steered vehicle has a coupling element 20, which in the embodiment shown is configured as a zero shaft 20. Although the embodiment of the coupling element 20 as a null shaft 20 is preferred, other embodiments of coupling elements are also possible. Hereinafter, the invention will be described with reference to a null shaft 20.

The zero shaft 20 of the steering drive system 11 is coupled to the wheel-side output drives 14, 15, namely to the left output drive 14 via a spur gear stage 21, which comprises the gears 21a, 21b, 21c, and via a superposition gear 22, and to the right output drive 15 via a spur gear stage 23, which comprises the gears 23a, 23b, 23c, 23d, and via a superposition gear 24. The number of gears 21a to 21 c and 23a to 23d shown in each case is purely exemplary.

Then, when the zero shaft 20 comes to a standstill, the wheel side steered vehicle drives straight ahead.

For steering, the zero shaft 20 must rotate, and then superposition rotational speed must be superimposed on the base speed at the respective output drive 14, 15 via the spur gear stages 21 and 23 and the superposition gears 22, 24 to effect steering of the wheel side steered vehicle.

The steering drive system 11 has a power summation unit and/or power branching unit 25. A first connection 25a of this power summation unit and/or power branching unit 25 is coupled to a shaft 26, which is coupled to the shaft 16 of the traction drive system 10 via the transmission ratio of the spur gear stage 19.

The gear 19b of this spur gear stage 19 is coupled in a rotationally fixed manner to an input-side or primary-side part of a starting element 27 of the main power distribution unit 17. An output-side or secondary-side part of the starting element 27 of the main power distribution unit 17 is coupled to a transmission input 13a of the driving gearbox 13. The starting element 27 may be a friction clutch or a hydrodynamic starting element. The state of the starting element 27 determines the power split of the main power distribution unit 17.

The starting element 27 and the gear 19b of the spur gear stage 19 together form the main power distribution unit 17.

The gear 19c of the spur gear stage 19, which meshes with the gear 19b of the main power distribution unit 17, forms a so-called primary power input 28 of the steering drive system 11, with a speed-fixed operative connection existing between the primary power input 28 of the steering drive system 11 and the first connection 25*a* of the power summation unit and/or power branching unit 25.

The power summation unit and/or power branching unit 25 of the steering drive system 11 has a second connection 25*b* to which at least one first electric machine 29 of the steering drive system 11 is coupled. A drive shaft 30 of the at least one first electric machine 29 is coupled to the second connection 25*b* of the power summation unit and/or power branching unit 25.

The speed of the at least one first electric machine 29 can be variably adjusted or controlled via a respective first power electronics 31, so that accordingly a variable speed can be provided at the second connection 25*b* of the power summation unit and/or power branching unit 25 via the respective first electric machine 29.

Furthermore, FIG. 1 shows a third connection 25*c* of the power summation unit and/or power branching unit 25 which is coupled to the zero shaft 20, in the shown exemplary embodiment via a spur gear stage 32 with the gears 32*a*, 32*b*. The number of gears 32*a* to 32*b* shown in each case is purely exemplary.

Depending on the transmission ratio of the spur gear stage 32, there is a rotationally fixed coupling of the third connection 25*c* of the power summation unit and/or power branching unit 25 to the zero shaft 20.

The steering drive system 11, which comprises at least the zero shaft 20 and the power summation and/or power branching unit 25 integrated in the steering drive system 11 in the above manner, permits low-loss, stepless steering over the entire steering and driving range of the wheel side steered vehicle. The speed of the at least one first electric motor 29 can be precisely controlled, allowing the superposition rotational speed at the zero shaft 20 to be precisely adjusted.

By electrically controlling the speed of the at least one first electric machine 29, the transmission capability of the steering towards the output drives 14, 15 can be freely selected. No mechanical forces are required to control or regulate the superposition rotational speed, so the steering drive system 11 provides a steer-by-wire concept.

In the particularly preferred embodiment of the steering drive system 11 shown in FIG. 1, the same comprises, in addition to the at least one first electric machine 29, at least one second electric machine 33 which is coupled to that shaft 26 to which the first connection 25*a* of the power summation unit and/or power branching unit 25 and the primary power input 28 are also coupled. The operation of the at least one second electric machine 33 can be controlled by a respective second power electronics 34.

The electric machines 29, 33 can be operated both generatively and motorically depending on the operating condition or operating situation.

In this way, the at least one second electric machine 33 can be operated in a regenerative manner during driving operation, so as to convert a first portion of the drive power provided starting from the main power distribution unit 17 at the primary power input 28 of the steering drive system 11 into electric energy, which can then be used for motor operation of the at least one first electric machine 29. In this case, the power summation unit and/or power branching unit 25 is used in a power summation operation to convert the power provided by the at least one first electric machine 29 at the second connection 25*b* of the power summation unit and/or power branching unit 25 and a second portion of the drive power of the traction drive system 10, which is provided by the main power distribution unit 17 to the primary power input 28 of the steering drive system 11 and which is applied to the first connection 25*a* of the power summation and/or power branching unit 25, superimposed to the third connection 25*c* of the power summation and/or power branching unit 25.

Conversely, the at least one first electric machine 29 may also operate in a generator mode and generate electric power, which may then be provided to the at least one second electric machine 33 to then drive the same in a motor mode. In this case, the power summation unit and/or power branching unit 25 is used in a power branching operation, wherein then the power summation unit and/or power branching unit 25 provides drive power of the traction drive system 10, which the main power branching unit 17 provides to the primary power input 28 of the steering drive system 11 and which is applied to the first connection 25*a* of the power summation unit and/or power branching unit 25, partly to the second connection 25*b* and partly to the third connection 25*c* of the power summation unit and/or power branching unit 25.

Then, when the steering drive system 11 comprises the at least one first electric machine 29 and the at least one second electric machine 33, the same can self-sufficiently supply itself with power and is independent of external energy, so that, in principle, no battery system is required. Power dissipators, such as braking resistors, and/or electrical energy storage units for dissipating excess power can be dispensed with.

Both the at least one first electric machine 29 and the at least one second electric machine 33 of the steering drive system 11 can be designed to be fault-tolerant. This can be ensured, for example, by providing several fully functional first electric machines 29 and/or several fully functional second electric machines 33, which are controlled electrically separately by two power electronics 31 and 34, respectively.

Alternatively, for fault-tolerant configurations, it is also possible to design the respective electrical machine 29, 33 with electrically separate phases, in which case each winding phase is controlled by electrically separate power electronics. In any case, with a fault-tolerant design of the respective electric machine, the steering can be protected against failure.

In the shown, preferred embodiment of the steering drive system 11, a power unit 35 is connected in parallel with the power summation unit and/or power branching unit 25, which is configured to couple the shaft 26, to which the first connection 25*a* of the power summation unit and/or power branching unit 25 is coupled, to the zero shaft 20 in parallel with the power summation unit and/or power branching unit 25. This power unit 35 is in particular a switchable friction clutch or a hydrodynamic clutch which is operated in slip in the closed state. According to FIG. 1, this power unit 35 is operatively connected to the zero shaft 20 via a spur gear stage 36 with gears 36*a*, 36*b*. Due to the torque support of the power unit or power element 35 when the power unit or power element 35 is operated in slip, the power density can be increased and a size of the respective electric machine 29, 33 can be reduced.

In the shown exemplary embodiment, a reversing gear 37 is integrated into the power summation unit and/or power branching unit 25, which is provided in particular by at least one planetary gear stage. Via such a reversing gear 37, a direction of rotation at the zero shaft 20 can be reversed to influence the steering direction. The reversing gear 37 can thereby be integrated at any position in the power summation unit and/or power branching unit 25, for example directly after the first connection 25*a* before a superposition with the power provided by the at least one first electric machine 29 or also after this superposition directly before the third connection 25c.

The power summation unit and/or power branching unit 25 of the steering drive system 11 can be operated in different operating states. Thus, in a first operating state thereof, the power summation unit and/or power branching unit 25 is configured to couple the first connection 25a and the second connection 25b to the third connection 25c in a superposition operation. Further, the power summation unit and/or power branching unit 25 is configured to couple, in a second operating state thereof, the first connection 25a and the second connection 25b to the third connection 25c both in a fixed transmission ratio operation, wherein the second connection 25b can then be operated in particular load-free.

Furthermore, the power summation unit and/or power branching unit 25 is preferably configured to provide a mixed operation between the first and second operating states in a third operating state.

Preferred embodiments of the power summation unit and/or power branching unit 25 are described below with reference to FIGS. 2 to 6.

Figure 2:
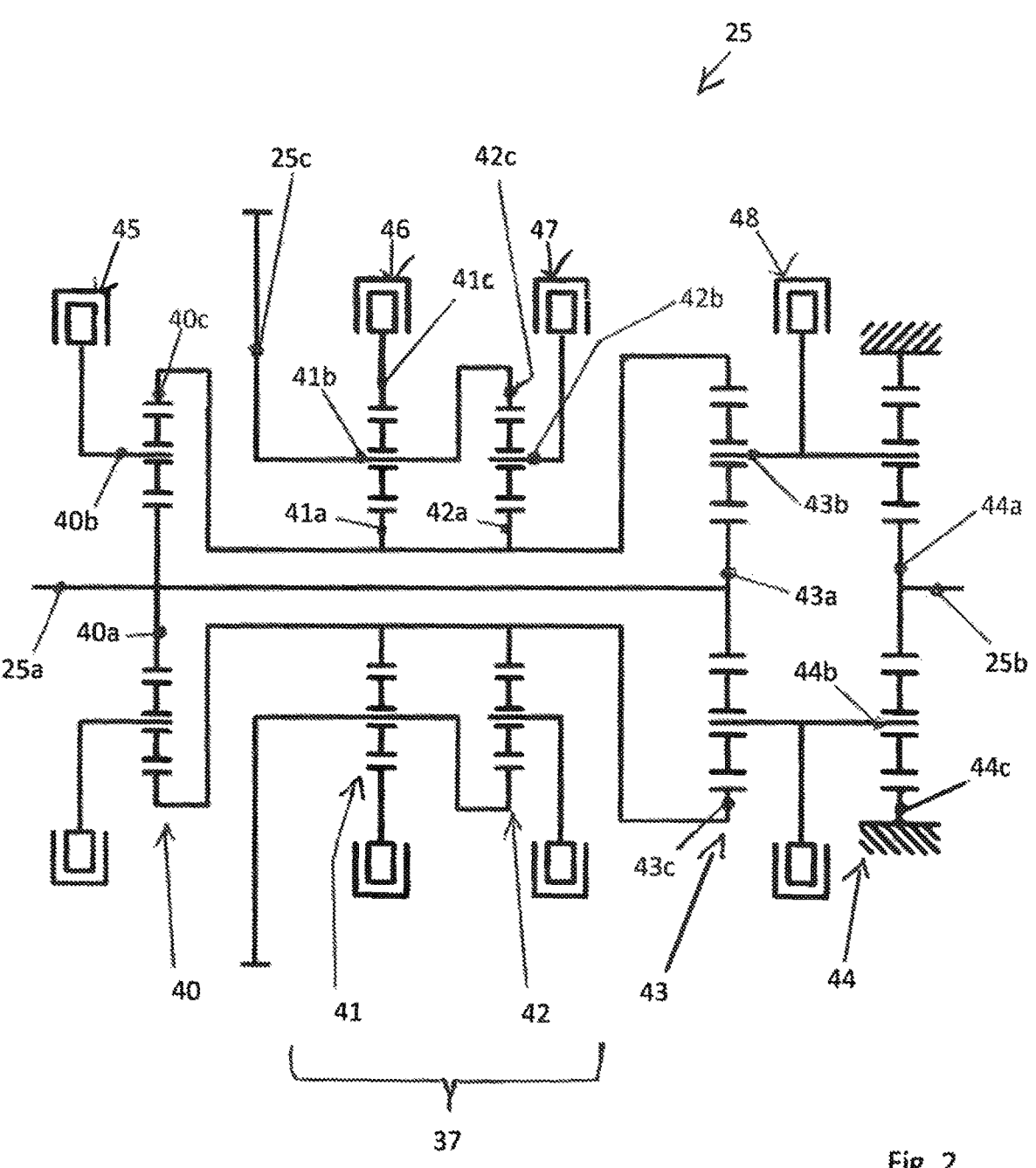
FIG. 2 illustrates an exemplary embodiment of a power summation unit and/or power branching unit of the steering drive system of FIG. 1 or 7 to 11.

FIG. 2 shows an embodiment of a power summation unit and/or power branching unit 25 with five planetary stages 40, 41, 42, 43 and 44 as well as four switching elements 45, 46, 47 and 48, all of which are designed as brakes. The two planetary stages 41 and 42, together with the two switching elements 46 and 47, form the reversing gear 37. Depending on the shift position of the switching elements 46 and 47, the direction of rotation of the zero shaft 20 can be influenced. The reversing gear 37 can alternatively be provided by bevel gear stages with clutches.

The first connection 25a of the power summation unit and/or power branching unit 25 of FIG. 2 is non-rotatably coupled to a sun gear 40a of the planetary stage 40 and to a sun gear 43a of the planetary stage 43. The second connection 25b of the power summation unit and/or power branching unit 25 of FIG. 2 is non-rotatably coupled to a sun gear 44a of the planetary stage 44. The third connection 25c of the power summation unit and/or power branching unit 25 is non-rotatably coupled to a ridge 41b of the planetary stage 41 of the reversing gear 37. A carrier 40b of the planetary stage 40 is either fixedly coupled to the housing or freely rotatable, depending on the shift position of the switching element 45. A ring gear 40c of the planetary stage 40 is coupled in a rotationally fixed manner to sun gears 41a, 42a of the two planetary stages 41, 42 of the reversing gear 37, likewise to a ring gear 43c of the planetary stage 43. The carrier 41b of the planetary stage 41 coupled to the third connection 25c is further coupled in a rotationally fixed manner to a ring gear 42c of the further planetary stage 42 of the reversing gear 37. In the planetary stage 41 of the reversing gear 37, a ring gear 41c thereof is either fixedly coupled to the housing or freely rotatable, depending on the shift position of the switching element 46. In the planetary stage 42 of the reversing gear 37, a carrier 42b thereof is either freely rotatable or fixedly connected to the housing, depending on the shift position of the shifting element 47. A carrier 44b of the planetary stage 44 whose sun gear 44a is coupled to the second input 25b is likewise coupled to the carrier 43b of the planetary stage 43 in a rotationally fixed manner, wherein both carriers 43b, 44b of these two planetary stages 43, 44 are either connected in a housing-fixed manner or can rotate freely depending on the switching position of the switching element 48. The ring gear 44c of that planetary stage 44 whose sun gear 44a is coupled to the second connection 25b of the power summation unit and/or power branching unit 25 is connected fixed to the housing in FIG. 2.

Then, in the power summation unit and/or power branching unit 25 of FIG. 2, when only the switching element 46 is closed and the switching elements 45, 47, and 48 are all open, the power summation unit and/or power branching unit 25 can be used in superposition operation, in a first direction of rotation of the zero shaft 20. In case only the switching element 47 is closed and the switching elements 45, 46, and 48 are all open, superposition operation in a second opposite direction of the zero shaft 20 is provided.

Then, when the switching elements 46 and 48 are each closed and the switching elements 45 and 47 are each open, the terminal 25a is coupled to the terminal 25c via a fixed transmission ratio in a first fixed transmission ratio operation mode, in which case the second connection 25b is fixed and, in particular, can be operated without load. Even when the switching elements 45 and 46 are both closed and the switching elements 47 and 48 are both open, the two connections 25a and 25b are coupled to the connection 25c via a fixed transmission ratio in a second fixed transmission ratio operating mode, in which case the connection 25b can again be operated in particular without load. If the switching elements 48 and 45 are not fully closed, but merely slip, mixed operation between the above-described operating modes, namely superimposed operation and fixed ratio operation, can be ensured. Analogous to the superimposed operation, by closing the switching element 47 instead of the switching element 46, all fixed ratio operation modes can also be operated in a second opposite direction of rotation of the zero shaft 20.

Figure 3:
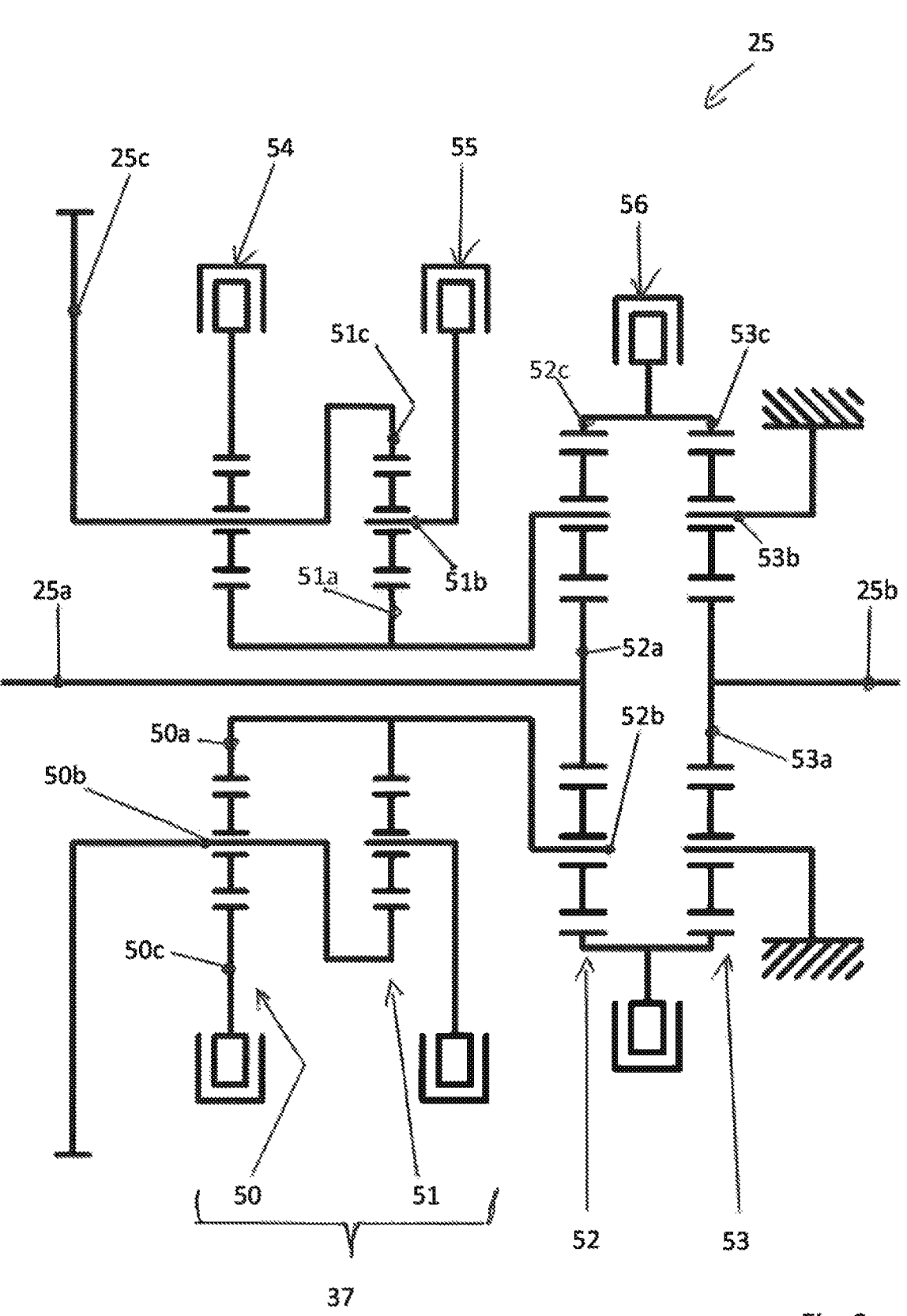
FIG. 3 illustrates an alternative embodiment of the power summation unit and/or power branching unit of the steering drive system of FIG. 1 or 7 to 11.

Another possible embodiment of the power summation unit and/or power branching unit 25 is shown in FIG. 3.

The power summation unit and/or power branching unit 25 of FIG. 3 has four planetary stages 50, 51, 52 and 53 as well as three switching elements 54, 55 and 56, which in turn are all configured as brakes. In FIG. 3, the planetary stages 50 and 51 and the switching elements 54 and 55 form the reversing gear 37.

In FIG. 3, the first connection 25a of the power summation unit and/or power branching unit 25 is rotationally fixedly coupled to the sun gear 52a of the planetary stage 52. The second connection 25b of the power summation unit and/or power branching unit 25 is rotationally fixedly coupled to the sun gear 53a of the planetary stage 53. The third connection 25c is non-rotatably coupled to the carrier 50b of the planetary stage 50 of the reversing gear 37. In FIG. 3, the ring gears 52c and 53c of the two planetary stages 52 and 53, to whose sun gears 52a, 53a the connections 25a, 25b are coupled in a rotationally fixed manner to one another and are operatively connected to the switching element 56 in such a way that, when the switching element 56 is closed, the two ring gears 52c, 53c are connected in a housing-fixed manner, but can rotate freely when the switching element 56 is open. The carrier 53b of the planetary stage 53, to whose sun gear 53a the second connection 25b is coupled in a rotationally fixed manner, is connected in a housing-fixed manner. The carrier 52b of the planetary stage 52, to the sun gear 52a of which the first connection 25a is coupled in a rotationally fixed manner, is coupled in a rotationally fixed manner to the two sun gears 50a, 51a of the two planetary stages 50, 51 of the reversing gear 37. The carrier 50b of the planetary stage 50 of the reversing gear 37, to which the third connection 25c is coupled, is further coupled in a rotationally fixed manner to the ring gear 51c of the other planetary stage 51 of the reversing gear 37. The carrier 51b of this planetary stage 51 is fixedly coupled to the housing when the switching element 55 is closed, and is free to rotate when the switching element 55 is open.

In the case where the power summation unit and/or power branching unit 25 of FIG. 3, when the switching element 54 is closed and the two switching elements 55 and 56 are both open, a superposition operation mode is provided in a first rotational direction of the zero shaft.

On the other hand, if the switching element 55 is closed and the two switching elements 54 and 56 are both open, a superposition operation mode is provided in an opposite second direction of rotation of the zero shaft 20.

When the two switching elements 54 and 56 are closed and the switching element 55 is open, a fixed ratio mode of operation is provided. By slipping operation of the switching element 56, a mixed operation between superposition operation and fixed ratio operation can be provided when the switching element 54 is fully closed and the switching element 55 is open. Analogous to the superimposed operation, by closing the switching element 55 instead of the switching element 54, all fixed ratio operation modes can also be operated in a second opposite direction of rotation of the zero shaft 20.

Figure 4:
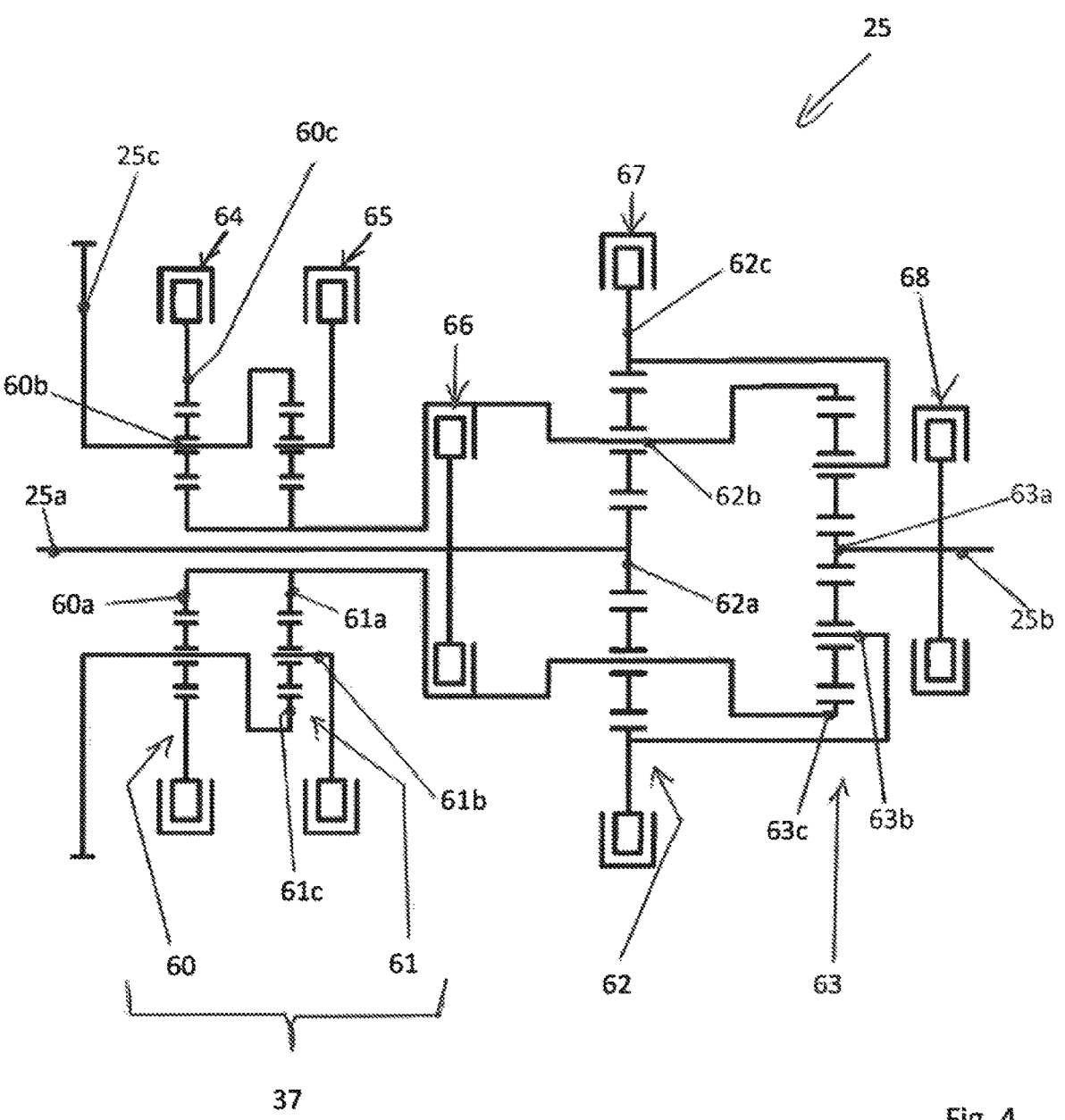
FIG. 4 depicts another alternative embodiment of the power summation unit and/or power branching unit of the steering drive system of FIG. 1 or 7 to 11.

Another preferred embodiment of a power summation unit and/or power branching unit 25 is shown in FIG. 4.

The power summation unit and/or power branching unit 25 shown in FIG. 4 has four planetary stages 60, 61, 62 and 63 and five switching elements 64, 65, 66, 67, 68. The switching elements 64, 65, 67, 68 are brakes, and the switching element 66 is a clutch. The two planetary stages 60 and 61 and the two switching elements 64 and 65 provide the reversing gear 37.

The first connection 25a of the power summation unit and/or power branching unit 25 is coupled in a rotationally fixed manner to a sun gear 62a of the planetary stage 62, and this sun gear 62a can be coupled to the carrier 62b of the planetary stage 62 depending on the shift position of the clutch 66. The ring gear 62c of this planetary stage 62 is either coupled fixed to the housing or freely rotatable, depending on the switching position of the brake 67.

The second connection 25b of the power summation unit and/or power branching unit 25 of FIG. 4 is coupled to the sun gear 63a of the planetary stage 63, whose carrier 63b is coupled to the ring gear 62c of the planetary stage 62, and whose ring gear 63c is coupled to the carrier 62b of the planetary stage 62. The second connection 25b can be made fixed via a switching element 68.

The sun gears 60a, 61a of the two planetary stages 60, 61 of the reversing gear 37 are both coupled to each other in a rotationally fixed manner and are connected to the carrier 62b of the planetary stage 62 and also to the sun gear 62a of the planetary stage 62 when the clutch 66 is closed.

The third connection 25c of the power summation unit and/or power branching unit 25 of FIG. 4 is rotationally fixed to the carrier 60b of the planetary stage 60 of the reversing gear 37, which is further rotationally fixed to the ring gear 61c of the other planetary stage 61 of the reversing gear 37. The ring gear 60c of the planetary stage 60 is either tethered to the housing or free to rotate, depending on the shift position of the brake 64. Further, the carrier 61b of the other planetary stage 61 of the reversing gear 37 is either tethered to the housing or is free to rotate depending on the shift position of the brake 65.

Then, when the switching element 64 is closed and all other switching elements 65, 66, 67 and 68 are respectively open, a superimposed operation mode can be provided in a first direction of rotation of the zero shaft 20. On the other hand, if only the switching element 65 is closed and the switching elements 64, 66, 67 and 68 are all open, a superposition operation mode is provided in a second opposite direction of rotation. Then, when the switching elements 64 and 67 are both closed and the other switching elements 65, 66, and 68 are all open, a first fixed ratio mode of operation can be provided. A second fixed ratio mode of operation is provided when the switching element 64 and the switching element 68 are closed, whereas the switching elements 65, 66 and 67 are all open. A third fixed ratio mode of operation is provided when the switching elements 64 and 66 are both closed and the switching elements 65, 67 and 68 are all open.

If the switching elements 66, 67 and 68 are operated in a slipping manner rather than in a fixed closed manner, a mixed operation between the superimposed operation and the fixed ratio operation can be provided. Analogous to the superimposed operation, by closing the switching element 65 instead of the switching element 64, all fixed ratio operation modes can also be operated in a second opposite direction of rotation of the zero shaft 20.

Figure 5:
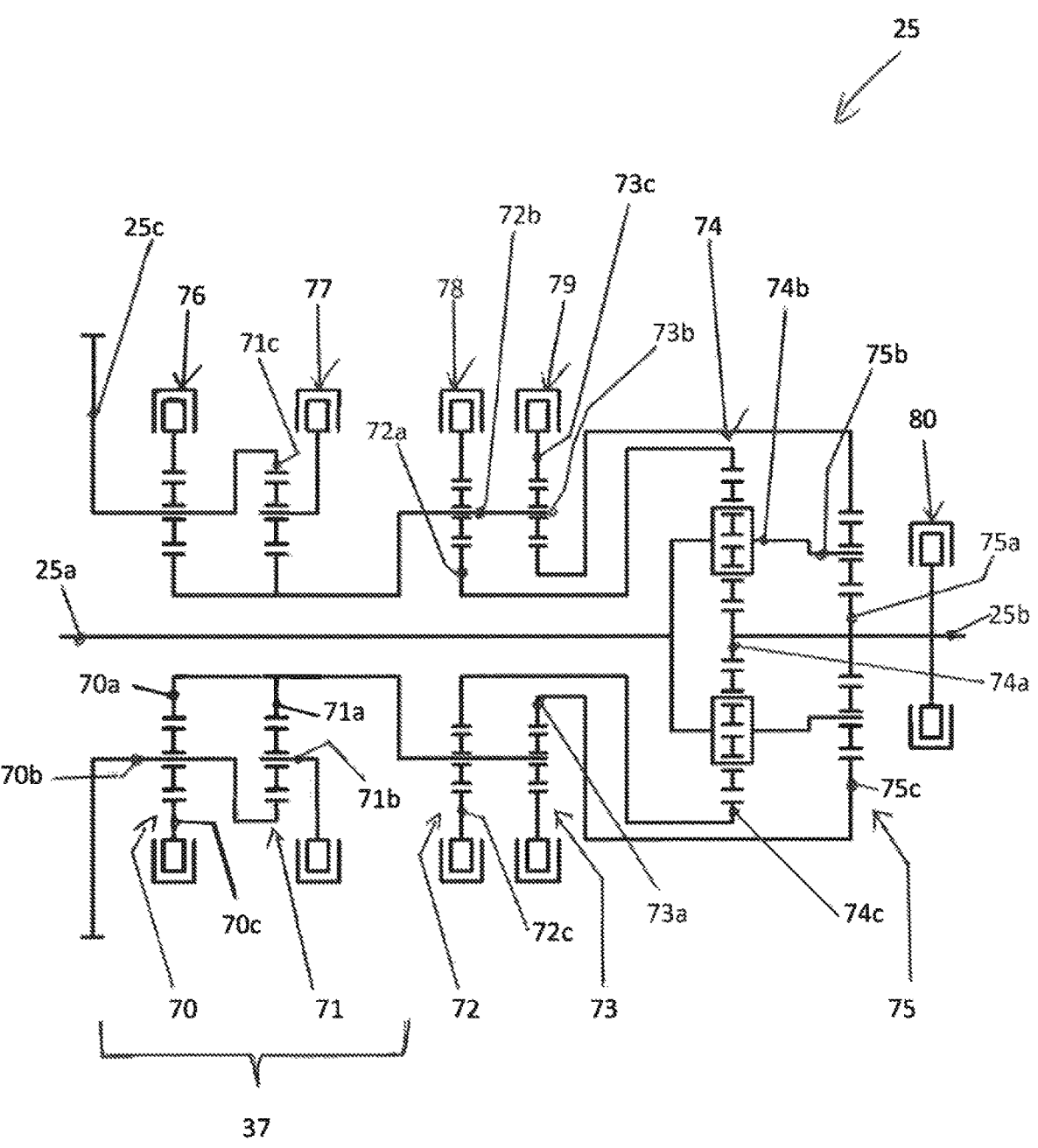
FIG. 5 depicts another alternative embodiment of the power summation unit and/or power branching unit of the steering drive system of FIG. 1 or 7 to 11.

Another power summation unit and/or power branching unit 25 is shown in FIG. 5. The power summation unit and/or power branching unit 25 of FIG. 5 has a total of six planetary stages 70, 71, 72, 73, 74 and 75 as well as a total of five switching elements 76, 77, 78, 79 and 80. The two planetary stages 70 and 71, together with the switching elements 76 and 77, provide the reversing gear 37.

The first connection 25a of the power summation unit and/or power branching unit 25 is non-rotatably coupled to the carrier 74b of the planetary stage 74, which carries a planet carrier 74b that accommodates two planet gears. Accordingly, the planetary stage 74 is a dual planetary set. The carrier 74b of this planetary stage 74 is coupled in a rotationally fixed manner to the carrier 75b of the planetary stage 75, to the sun gear 75a of which the second connection 25b of the power summation and/or power branching unit 25 is coupled in a rotationally fixed manner. The sun gear 75a of the planetary stage 75 can be fixedly connected to the housing via the switching element 80 configured as a brake. In this case, the sun gear 75a is coupled in a rotationally fixed manner to the sun gear 74a of the planetary stage 74 configured as a double planetary stage. The ring gear 74c of the planetary stage 74 is coupled to the sun gear 72a of the planetary stage 72 in a rotationally fixed manner, and the ring gear 75c of the planetary stage 75 is coupled to the sun gear 73a of the planetary stage 73 in a rotationally fixed manner. The carriers 72b and 73b of these two planetary stages 72 and 73 are coupled to each other in a rotationally fixed manner, as well as to the sun gears 70a and 71a of the two planetary stages 70, 71 of the reversing gear 37.

The ring gears 72c and 73c of the planetary stages 72 and 73 can either rotate freely or are fixedly coupled to the housing, depending on the switching position of the switching elements 78 and 79. The carrier 70b of the planetary stage 70 of the reversing gear 37 is coupled to the ring gear 71c of the other planetary stage 71 of the reversing gear 37 in a rotationally fixed manner. The switching element 76 interacts with the ring gear 70c of the planetary stage 70, and the switching element 77 interacts with the carrier 71b of the planetary stage 71.

The power summation unit and/or power branching unit 25 of FIG. 5 can be used to provide superposition operation modes with different speeds. When the switching elements 76 and 78 are both closed, while the other switching elements are all open, a first superposition operation mode is provided with a relatively slow rotation speed of the zero shaft 20 in a first rotation direction thereof. On the other hand, if the switching element 76 is closed together with the switching element 79 and the other switching elements are open, a relatively fast rotating superposition operation mode is provided in the first rotation direction of the zero shaft 20. If the two switching elements 77 and 78 are both closed and the other switching elements are open, the relatively slow superposition operation mode is provided in an opposite second direction of rotation of the zero shaft, but if the switching elements 77 and 79 are both closed and the other switching elements are open, a relatively fast rotating super-position operation mode is provided in the opposite second direction of rotation.

By closing the switching element 80, fixed ratio modes of operation can be provided, namely when the switching elements 76, 78 and 80 are closed, a first fixed ratio mode of operation and when the switching elements 76, 79 and 80 are closed, a second fixed ratio mode of operation.

If the switching element 80 is not closed in a fixed manner, but is operated in a slipping manner, a mixed operation between the superimposed operation and the fixed transmission operation can be ensured. Analogous to the superimposed operation, by closing the switching element 77 instead of the switching element 76, all fixed ratio operation modes can also be operated in a second opposite direction of rotation of the zero shaft 20.

Figure 6:
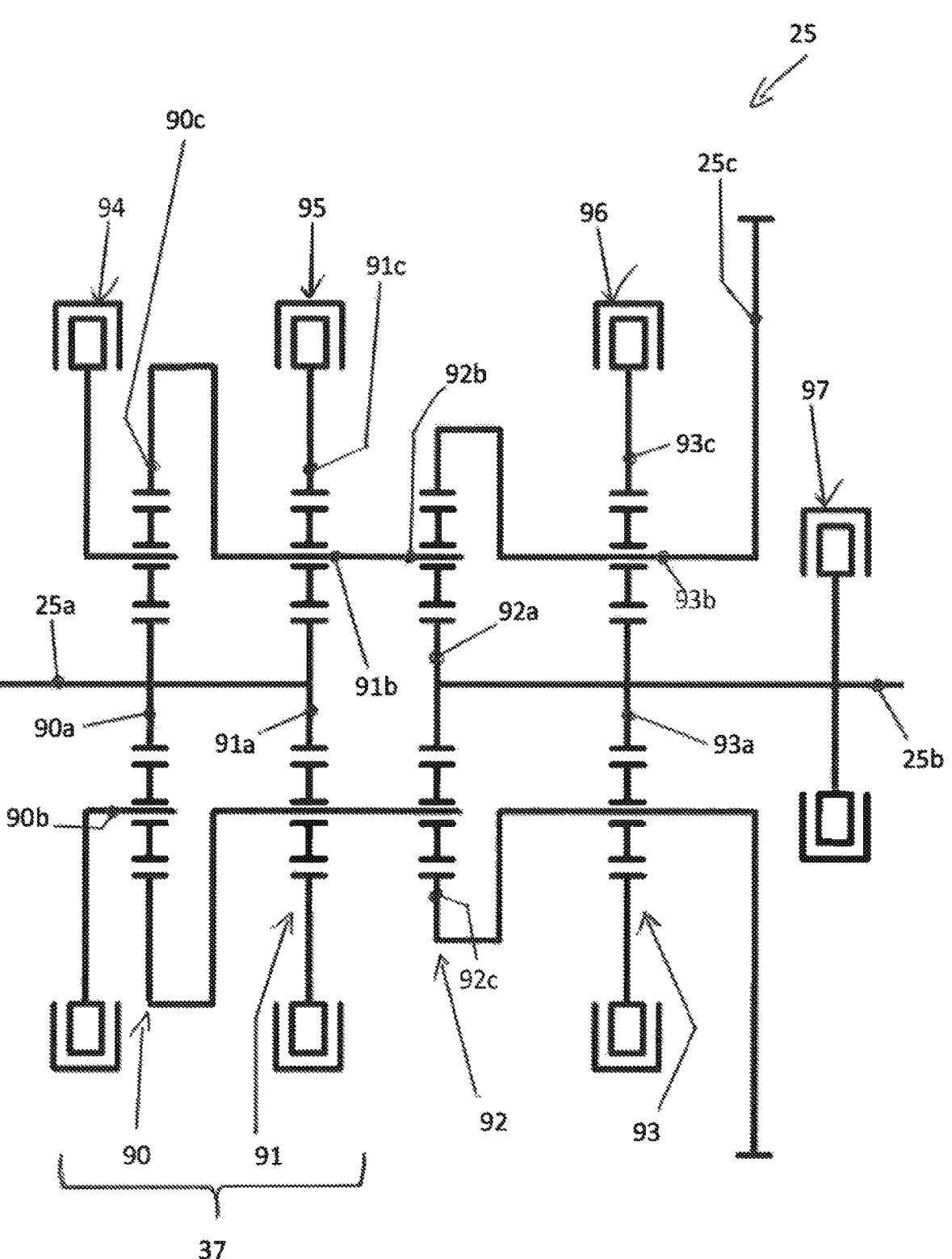
FIG. 6 depicts another alternative embodiment of the power summation unit and/or power branching unit of the steering drive system of FIG. 1 or 7 to 11.

Also FIG. 6 shows an embodiment of a power summation unit and/or power branching unit 25. The power summation unit and/or power branching unit 25 of FIG. 6 has four planetary stages 90, 91, 92 and 93 and four switching elements 94, 95, 96 and 97. The two planetary stages 90 and 91 together with the two switching elements 94 and 95 form the reversing gear 37.

The first connection 25a of the power summation unit and/or power branching unit 25 is non-rotatably coupled to the two sun gears 90a, 91a of the two planetary stages 90, 91 of the reversing gear 37. The carrier 90b of the planetary stage 90 is fixedly coupled to the housing or freely rotatable, depending on the switching position of the switching element 94. The ring gear 90c of the planetary stage 90 is coupled to the carrier 91b of the planetary stage 91 of the reversing gear 37 in a rotationally fixed manner, and further to the carrier 92b of the planetary stage 92. The ring gear 91c of the planetary stage 91 of the reversing gear 37 is either coupled to the housing in a rotationally fixed manner or is freely rotatable, depending on the switching position of the switching element 95. The second connection 25b of the power summation unit and/or power branching unit 25 is rotationally fixedly connected to the sun gears 92a, 93a of the two planetary stages 92 and 93. Via the switching element 97, these two sun gears 92a, 93a can be fixedly connected to the housing. The ring gear 92c of the planetary stage 92 is non-rotatably connected to the carrier 93b of the planetary stage 93, to which the third connection 25c of the power summation unit and/or power branching unit 25 is also connected. The ring gear 93c of the planetary stage 93 is fixedly connected to the housing or freely rotatable, depending on the switching position of the switching element 96.

Then, when the switching element 94 is closed and the switching elements 95, 96 and 97 are all open, a superposition operation mode is provided in a first direction of rotation of the zero shaft 20. On the other hand, if the switching element 95 is closed and the switching elements 94, 96 and 97 are all open, a superposition operation mode in an opposite second direction of rotation is provided. If only the switching element 96 is closed and the switching elements 94, 95 and 97 are all open, the first connection 25a is disconnected and only the at least one first electric machine 29 connected to the second connection 25b provides power to the power summation unit and/or power branching unit 25. When the switching elements 94 and 97 are both closed and the switching elements 95 and 96 are both open, a fixed ratio operation is provided.

If the switching element 97 is not closed in a fixed manner, but is operated in a slipping manner, a mixed operation between the superposition operation and the fixed ratio operation can be provided. Analogous to the superimposed operation, by closing the switching element 95 instead of the switching element 94, the fixed ratio operation mode can also be operated in a second opposite direction of rotation of the zero shaft 20.

By selecting the operating states in the power summation unit and/or power branching unit 25, in combination with the control of the rotational speed at the at least one first electric machine 29, the rotational speed at the zero shaft 20 can be adjusted in a particularly advantageous stepless manner. This can ensure stepless steering over the entire steering range. The transmission ratios of the planetary stages are preferably selected in such a way that there is no abrupt change in speed at the zero shaft 20 when switching from one operating mode to the other. The at least one first electric machine 29 can actively regulate its slip.

The power summation unit and/or power branching unit 25 thus has at least four planetary sets and at least three switching elements, with at least two planetary sets and at least two switching elements forming the reversing gear 37 integrated in the power summation unit and/or power branching unit 25, and with at least two further planetary sets and at least one further switching element being involved in providing the different operating states of the power summation unit and/or power branching unit 25 depending on the switching position of the switching elements.

The superposition operation is respectively the normal operation mode of the power summation unit and/or power branching unit 25. Various functions can be covered with the fixed ratio operation: first, a fixed ratio can be set by firmly closing the switching elements involved in providing the fixed ratios, so that power is provided purely through the first connection 25a and the second connection 25b is loadless. In that case, superposition no longer takes place. This mode of operation can be used, for example, as an emergency mode, if, for example, the at least one first electric machine 29 and/or the at least one second electric machine 33 fails. With the fixed gear ratios, fixed steering radii may be set. Secondly, by slipping or sliding closure of the switching elements, a portion of the power can be transmitted to the reversing gear via the superposition, or past the superposition, in order to relieve the at least one first electric machine 29 at the second connection 25b. This allows the design size to be reduced in terms of power and/or installation space for the at least one first electric machine 29.

FIG. 1 further shows a switchable clutch 38 of the traction drive system 10, via which the at least one drive unit 12 can be uncoupled, namely from the main power distribution unit 17 and thus from the driving gearbox 13. Furthermore, FIG. 1 shows an electric machine 39 of the travel drive system 10, which is coupled to the shaft 16.

Via such an electric machine 39 of the travel drive system 10, the at least one second electric machine 33 of the steering drive system 11 can be supplemented or supported. This can increase the performance of the functionality provided by the at least one second electric machine 33 of the steering drive system 11.

In a regular driving mode of the wheel side steered vehicle, in which the drive unit 12 is running and coupled to the main power distribution unit 17 with the clutch 38 closed, a part of the power provided by the drive unit 12 is transmitted towards the driving gearbox 13 and thus via the driving gearbox 13 towards the output drives 14, 15, a second part of this driving power is fed into the steering drive system 11 via the main power distribution unit 17. In this case, the at least one second electric machine 33 can then be operated as a generator to convert a portion of this power into electrical energy for driving the at least one first electric machine 29. Thus, without the need for a traction battery, the steering drive system 11 can then be operated autonomously.

Then, when the drive unit 12 is switched off or fails or is blocked, the clutch 38 is preferably opened to disconnect the drive unit 12. If, in this state, the wheel side steered vehicle is rolling and thus has kinetic energy, this kinetic energy present at the output drives 14, 15 can be used to steer the vehicle via the steering drive system 11.

Alternatively or additionally, it is possible to convert kinetic energy of the wheel side steered vehicle into electrical energy by using the kinetic energy to operate the at least one second electrical machine 33 and/or the at least one further electrical machine 39 in a regenerative manner.

If the drive unit 12 is uncoupled when the clutch 38 is open, and if the wheel side steered vehicle has, for example, a traction battery, the electrical power held in the traction battery can be used to operate both the at least one first electric machine 29 and the at least one second electric machine 33 of the steering drive system 11 and, if necessary, also the further electric machine 39 of the travel drive system 10, in each case motorically, in order to ensure on the one hand driving and on the other hand steering of the vehicle. The energy required for this does not have to be kept available in a traction battery; it is also possible in this case to use a fuel cell or the like to then supply the electric machine 29, 33, 39 with electrical energy.

Figure 7:
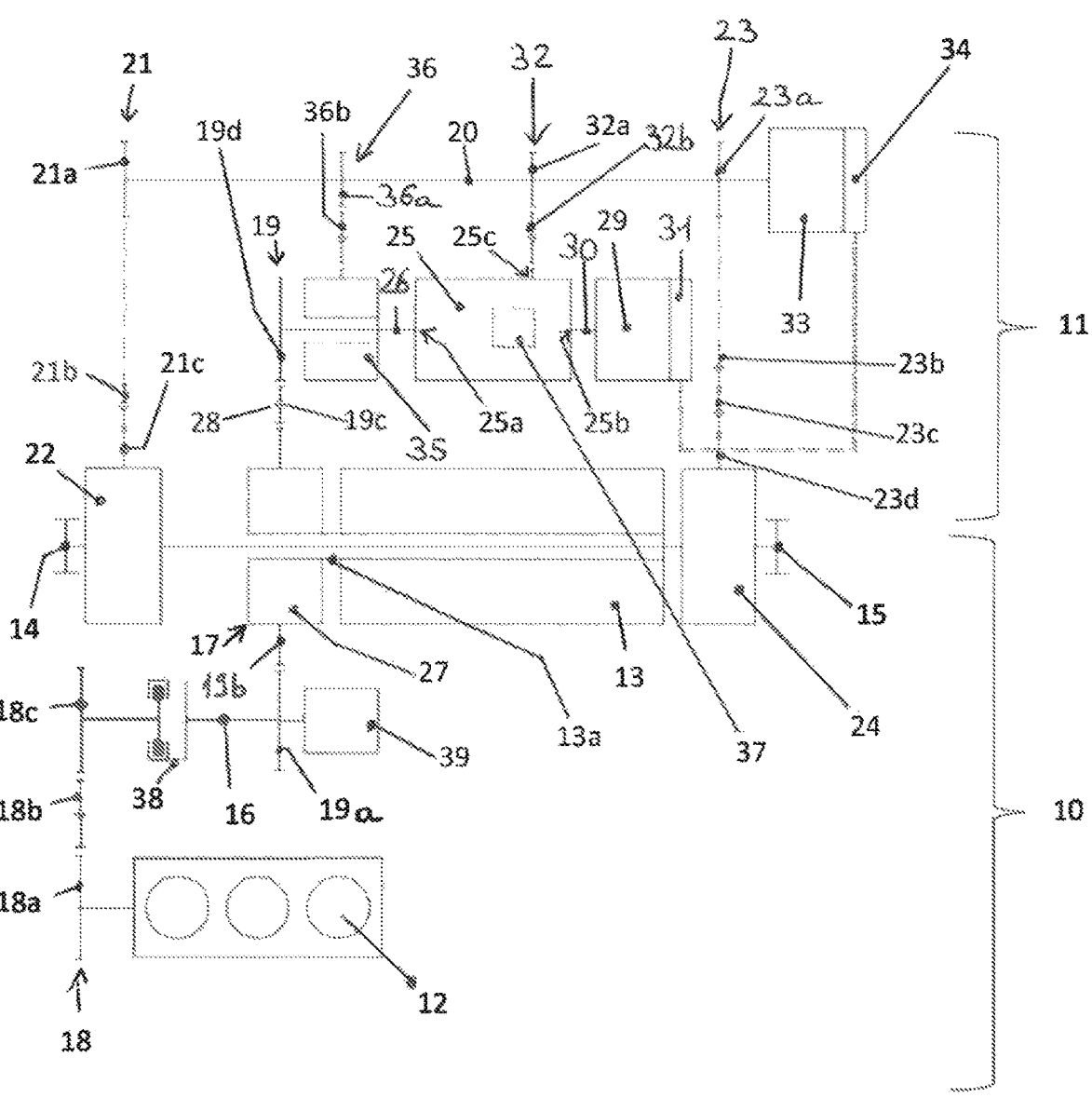
FIG. 7 is a schematic representation of a further steering drive system for a wheel side steered vehicle together with a travel drive system of the wheel side steered vehicle.

FIG. 7 shows a schematic representation of a further steering drive system of a wheel side steered vehicle together with a travel drive system thereof. The arrangement of FIG. 7 corresponds for the most part to the arrangement of FIG. 1 with regard to its construction, which is why the same assemblies are used for the arrangement of FIG. 7 as for the arrangement of FIG. 1 in order to avoid unnecessary repetition. In the following, only those details are discussed by which the arrangement of FIG. 7 differs from the arrangement of FIG. 1. With regard to all other details, reference can be made to the above explanations for FIGS. 1 to 6. In FIG. 7, the at least one second electric machine 33 is not coupled to the shaft 26 to which the first connection 25*a* of the power summation unit and/or power branching unit 25*a* is also coupled, but to the coupling element 20 or the zero shaft 20. There are no other differences.

The methods according to the invention can also be used in connection with the arrangement of FIG. 7. However, with the arrangement of FIG. 7, it is not possible for a second electric machine 33 of the steering drive system 11, which is operated as a generator, to convert a first part of the drive power of the traction drive system 10, which is provided by the main power distribution unit 17 on the steering drive system 11, into electric energy.

However, with the arrangement of FIG. 7, the second electric machine 33 can convert drive power at the zero shaft 20 into electric power.

For FIGS. 8 to 11, those parts are provided with reference signs which differ from the features, or components and/or assemblies already described in the schematic representations of a steering drive system for a or a wheel side steered vehicle together with a travel drive system of the wheel side steered vehicle shown, exemplary, embodiments in FIG. 1 and FIG. 7, or which are necessary for explaining, in particular explaining the mode of operation, of a differently arranged and/or as yet not described component and/or assembly. The (remaining) components and/or assemblies, which do not differ in the representation at least substantially from the components and/or assemblies already shown in FIG. 1 and FIG. 7, correspond to these already described components and/or assemblies and are therefore (for the sake of clarity) not provided with reference signs.

Figure 8:
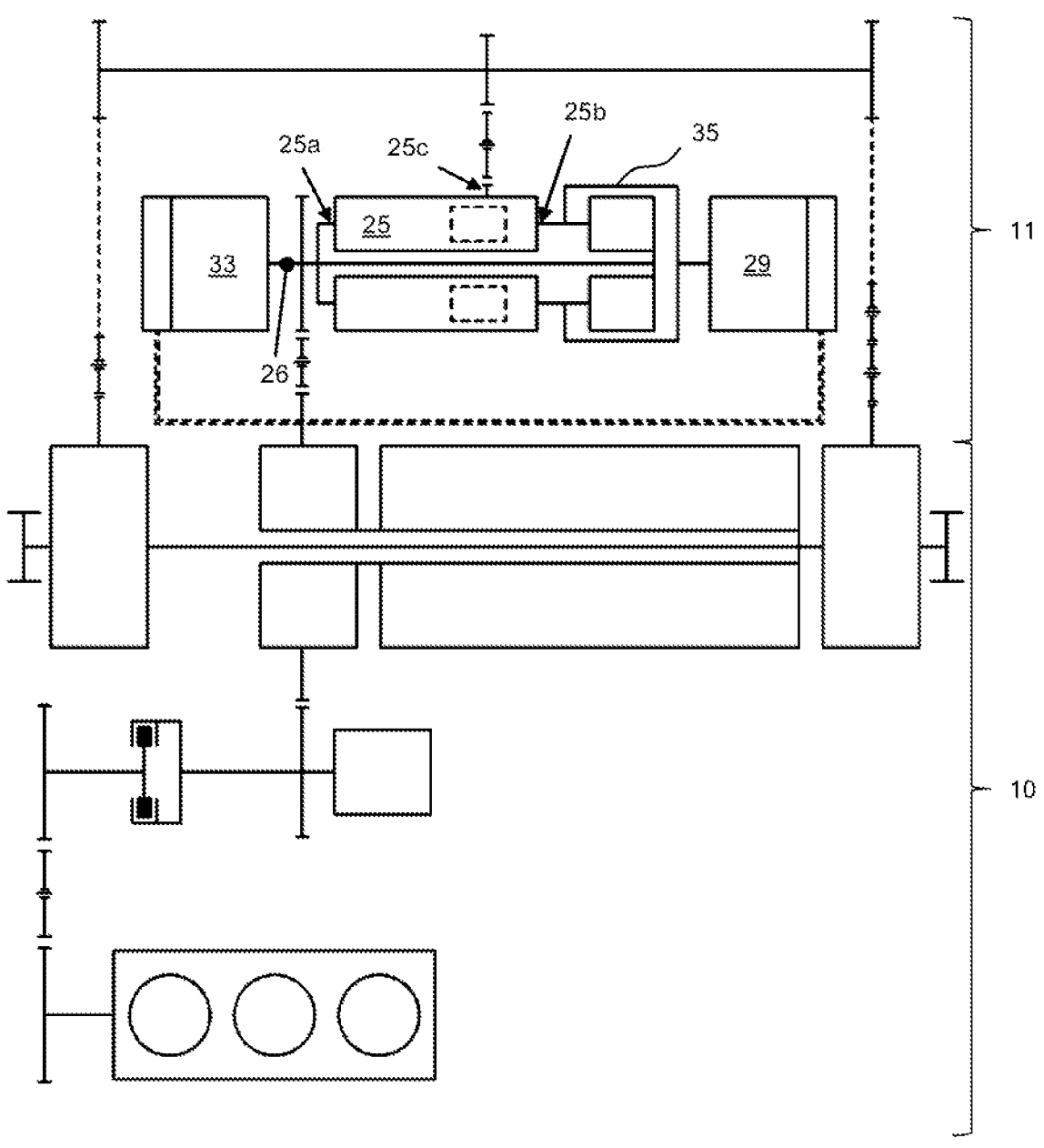
FIG. 8 is a schematic representation of a further steering drive system for a wheel side steered vehicle together with a travel drive system of the wheel side steered vehicle.

Thus FIG. 8 shows a schematic representation of a steering drive system 11 for a wheel side steered vehicle together with a travel drive system 10 of the wheel side steered vehicle with a power unit 35 arranged between the first electric machine 29 and the second connection 25*b* of the power summation unit and/or power branching unit 25. The power unit 35 is configured to couple the shaft 26, to which the first connection 25*a* of the power summation and/or power branching unit 25 is also coupled, in parallel with the first electric machine 29, in particular by slipping, to the power summation and/or power branching unit 25, in FIG. 8 exemplarily its second connection 25*b*.

Figure 9:
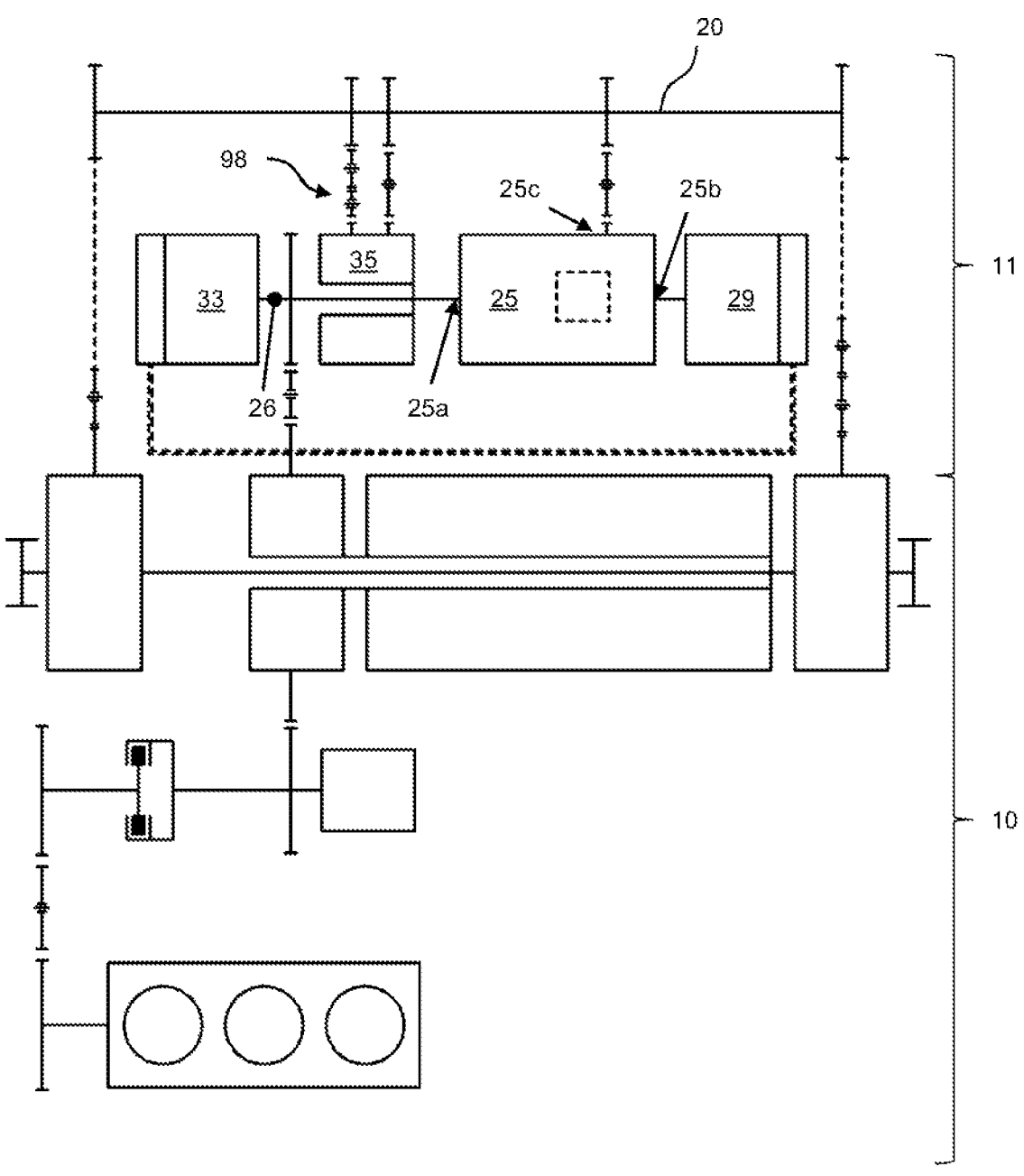
FIG. 9 is a schematic representation of a further steering drive system for a wheel side steered vehicle together with a travel drive system of the wheel side steered vehicle.

FIG. 9 shows a schematic representation of a steering drive system 11 for a wheel side steered vehicle together with a travel drive system 10 of the wheel side steered vehicle in which at least two gear wheel tracks of a rotation direction reversing unit 98 coupled to the coupling element 20 are shown. Depending on the operating state of the power unit 35, or the rotation direction reversing unit 98, the shaft 26 is coupled to the coupling element 20 via one of the two gear wheel tracks of the rotation direction reversing unit 98 with a direction of rotation corresponding to the operating state. In particular, the rotation direction reversing unit 98, or rather the gear wheel tracks thereof, can be used to reverse the direction of rotation, and in particular not the power unit 35.

Figure 10:
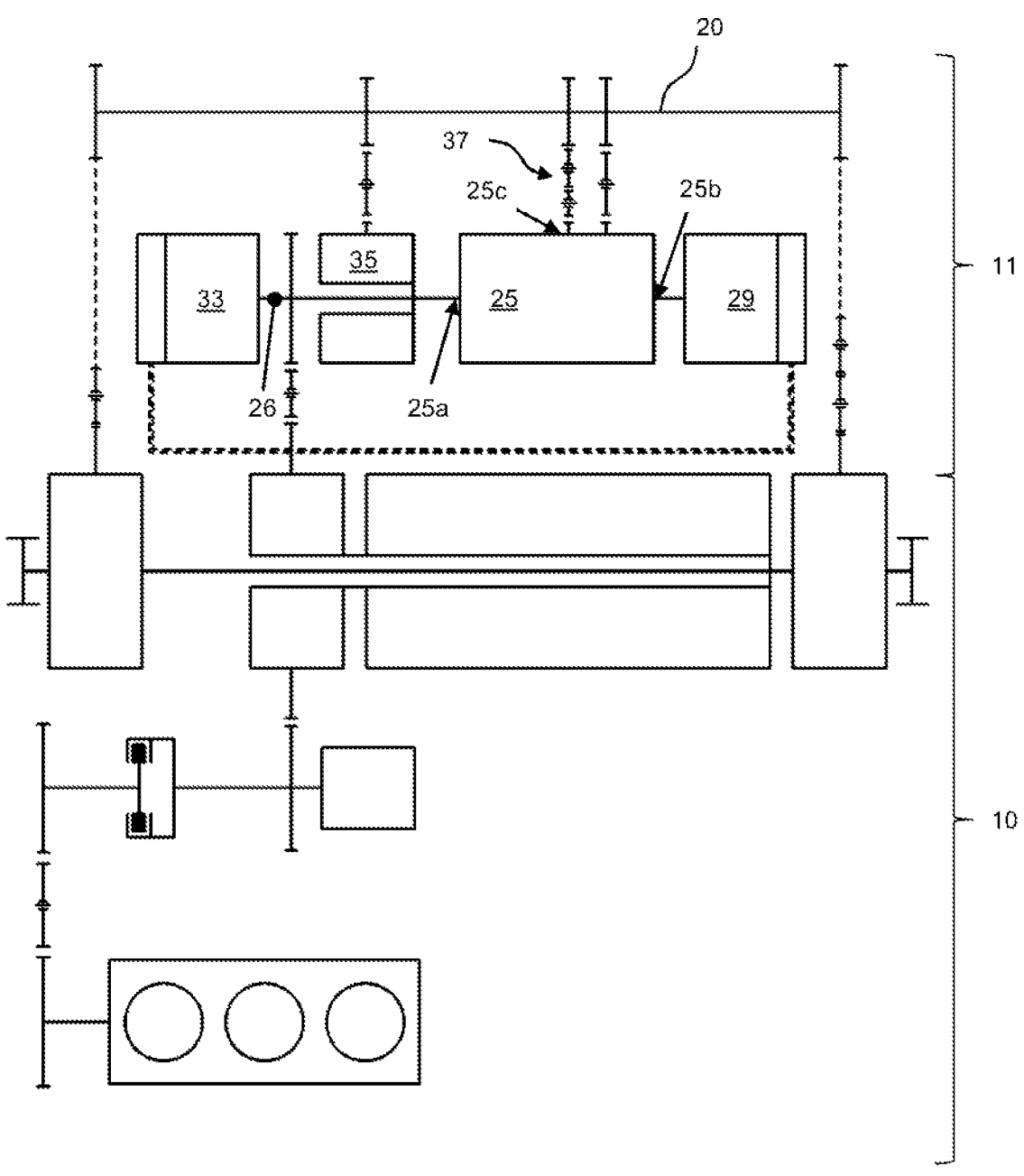
FIG. 10 is a schematic representation of a further steering drive system for a wheel side steered vehicle together with a travel drive system of the wheel side steered vehicle.

In FIG. 10, a schematic representation of a steering drive system 11 for a wheel side steered vehicle is shown together with a travel drive system 10 of the wheel side steered vehicle, in which the output (third connection 25*c*) is connected to the coupling element 20 with two gear wheel tracks instead of one gear wheel track. In other words, the reversing gear in FIG. 10 is not arranged in the power summation unit and/or power branching unit 25, but between the power summation unit and/or power branching unit 25 and the coupling element 20. Depending on the operating state, the reversing gear couples the power summation unit and/or power branching unit 25 to the coupling element 20 via, in particular via one of the two, the gear wheel tracks with a direction of rotation corresponding to the operating state. In other words, the third connection 25*c* of the power summation unit and/or power branching unit 25 is coupled via the two gear wheel tracks to coupling element 20, alternatively and with opposite directions of rotation.

Figure 11:
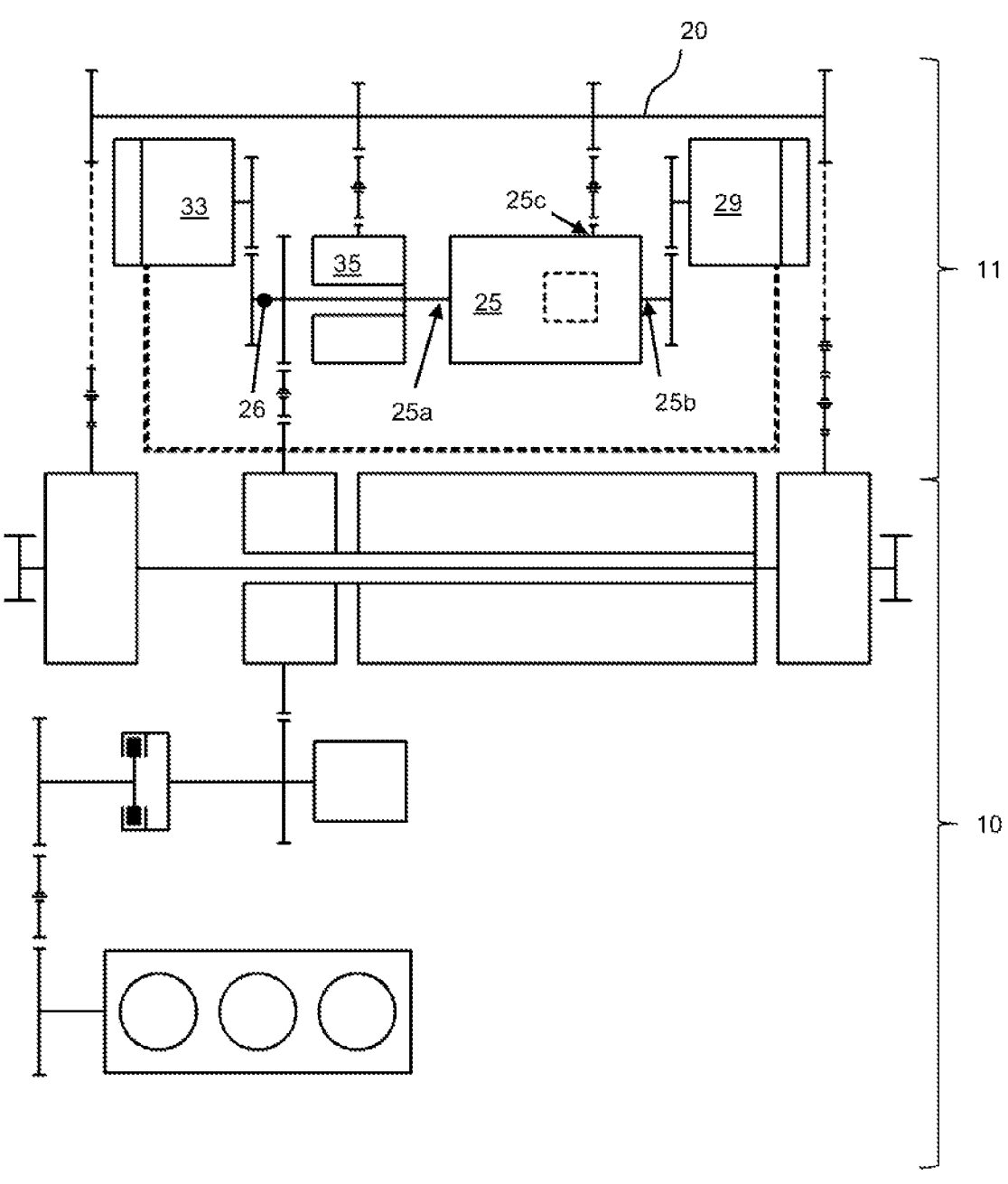
FIG. 11 is a schematic representation of a further steering drive system for a wheel side steered vehicle together with a travel drive system of the wheel side steered vehicle.

FIG. 11 shows a schematic representation of a steering drive system 11 for a wheel side steered vehicle together with a travel drive system 10 of the wheel side steered vehicle in which the first electric machine 29 and the second electric machine 33 are coupled to the input shafts of the power summation unit and/or power branching unit 25, in particular the first connection 25*a* and the second connection 25*b*, via a defined transmission ratio which is not zero.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

10 Travel drive system
11 Steering drive system
12 Drive unit
13 Driving gearbox
13*a* Gearbox input
14 Output drive
15 Output drive
16 Shaft
17 Main power distribution unit
18 Spur gear stage
18*a* Gear
18*b* Gear
18*c* Gear
19 Spur gear stage
19*a* Gear
19*b* Gear
19*c* Gear
19*d* Gear
20 Coupling element/coupling element/zero shaft
21 Spur gear stage
21*a* Gear
21*b* Gear
21*c* Gear
22 Superposition gear
23 Spur gear stage
23*a* Gear
23*b* Gear
23*c* Gear
23*d* Gear
24 Superposition gear
25 power summation and/or power branching unit
25*a* first connection
25*b* second connection
25*c* third connection
26 shaft
27 starting element
28 primary power input
29 first electric machine
30 drive shaft
31 first power electronics
32 spur gear stage
32*a* gear
32*b* gear
33 second electric machine
34 second power electronics
35 power unit
36 spur gear stage
36*a* Gear

36*b* Gear
37 reversing gear
38 clutch
39 electric machine
40 planetary stage
40*a* sun gear
40*b* carrier
40*c* ring gear
41 planetary stage
41*a* Sun gear
41*b* carrier
41*c* Ring gear
42 Planetary stage
42*a* Sun gear
42*b* carrier
42*c* Ring gear
43 Planetary stage
43*a* Sun gear
43*b* carrier
43*c* Ring gear
44 Planetary stage
44*a* Sun gear
44*b* carrier
44*c* Ring gear
45 Switching element
46 Switching element
47 switching element
48 switching element
50 Planetary stage
50*a* Sun gear
50*b* carrier
50*c* Ring gear
51 Planetary stage
51*a* Sun gear
51*b* carrier
51*c* Ring gear
52 Planetary stage
52*a* Sun gear
52*b* carrier
52*c* Ring gear
53 Planetary stage
53*a* Sun gear
53*b* carrier
53*c* Ring gear
54 Switching element
55 Switching element
56 Switching element
60 Planetary stage
60*a* Sun gear
60*b* carrier
60*c* Ring gear
61 Planetary stage
61*a* Sun gear
61*b* carrier
61*c* Ring gear
62 Planetary stage
62*a* Sun gear
62*b* carrier
62*c* Ring gear
63 Planetary stage
63*a* Sun gear
63*b* carrier
63*c* Ring gear
64 Switching element
65 Switching element
66 Switching element
67 Switching element

68 Switching element
70 Planetary stage
70*a* Sun gear
70*b* carrier
70*c* Ring gear
71 Planetary stage
71*a* Sun gear
71*b* carrier
71*c* Ring gear
72 Planetary stage
72*a* Sun gear
72*b* carrier
72*c* Ring gear
73 Planetary stage
73*a* Sun gear
73*b* carrier
73*c* Ring gear
74 Planetary stage
74*a* Sun gear
74*b* carrier
74*c* Ring gear
75 Planetary stage
75*a* Sun gear
75*b* carrier
75*c* Ring gear
76 Switching element
77 Switching element
78 Switching element
79 Switching element
80 Switching element
90 Planetary stage
90*a* Sun gear
90*b* carrier
90*c* Ring gear
91 Planetary stage
91*a* sun gear
91*b* carrier
91*c* ring gear
92 Planetary stage
92*a* Sun gear
92*b* carrier
92*c* ring gear
93 Planetary stage
93*a* Sun gear
93*b* carrier
93*c* Ring gear
94 Switching element
95 Switching element
96 Switching element
97 Switching element
98 Rotation direction reversing device

What is claimed is:

1. A steering drive system for a wheel side steered vehicle, the steering drive system comprising:

a coupling element configured to be coupled to output drives of the vehicle, which output drives are driven at a basic rotational speed by a traction drive system of the vehicle, such that, when an amount of a superposition rotational speed of the coupling element is greater than zero, the coupling element provides at the output drives a superposition rotational speed that is superposed on the basic rotational speed to thereby steer the vehicle;

at least one first electric machine having a rotational speed that is variably controllable;

a power summation and/or power branching unit;

a first connection of the power summation and/or power branching unit is coupled to a first shaft that is configured to be coupled to a shaft of the traction drive system;

a second connection of the power summation and/or power branching unit is coupled to the at least one first electric machine;

a third connection of the power summation and/or power branching unit is coupled to the coupling element;

and at least one of:

a reversing gear configured to reverse a direction of rotation of the coupling element, wherein the reversing gear is arranged after a superposition of the power provided by the first shaft with the power provided by the at least one first electric machine, or a power unit connected in parallel with the power summation and/or power branching unit, and configured to couple the first shaft in parallel with the power summation and/or power branching unit to the coupling element.

2. The steering drive system of claim 1, wherein at least one of:

the second connection of the power summation and/or power branching unit is coupled to the at least one first electric machine via a defined transmission ratio;

the first shaft is configured to be coupled to the shaft of the traction drive system via a defined transmission ratio; or the third connection of the power summation and/or power branching unit is coupled to the coupling element via at least one defined transmission ratio.

3. The steering drive system of claim 1, wherein at least one of:

the steering drive system further comprises at least one first power electronics unit interacting with each at least one first electric machine and configured to regulate the speed of the respective first electric machine; or the respective first electric machine is designed with electrically separate phases.

4. The steering drive system of claim 1, further comprising:

at least one second electric machine coupled to the first shaft to which the first connection of the power summation and/or power branching unit is also coupled.

5. The steering drive system of claim 1, further comprising at least a second electric machine coupled to the coupling element.

6. The steering drive system according to claim 5, wherein at least one of:

at least one second power electronics unit cooperates with the at least one second electric machine and is designed to regulate the speed of the respective second electric machine; or the respective second electric machine is designed with electrically separate phases.

7. The steering drive system of claim 1, further comprising at least one second electric machine configured to at least one of:

supply the at least one first electric machine, in particular directly, with electrical energy in a regenerative mode; or be supplied with electrical energy, in particular directly, by the at least one first electric machine in a motoring mode.

8. The steering drive system of claim 1, wherein:

the power unit is designed to couple the first shaft to the coupling element in parallel with the power summation and/or power branching unit such that:

in a first operating state of the power unit the first shaft and the power summation and/or power branching unit rotate in a first direction, and in a second operating state of the power unit the first shaft and the power summation and/or power branching unit rotate in a second direction opposite the first direction; or the steering drive system comprises at least two gear wheel tracks coupled to the coupling element such that:

a first gear wheel track is designed, in the first operating state of the power unit, to couple the first shaft to the coupling element in the first direction of rotation, and a second gear wheel track is designed to couple the first shaft to the coupling element in the second operating state of the power unit in the second direction opposite the first direction.

9. The steering drive system of claim 8, wherein the power unit is configured as a rotation direction reversing unit with at least one gear wheel track coupled to the coupling element such that:

in the first operating state of the power unit the at least one gear wheel track rotates the coupling element in the first direction; and in the second operating state of the power unit the at least one gear wheel track rotates the coupling element in the second direction opposite the first direction.

10. The steering drive system of claim 1, further comprising:

a power unit arranged between the first electrical machine and the second connection of the power summation and/or power branching unit;

the power unit designed to couple the first shaft to the power summation and/or power branching unit, in parallel with the first electrical machine.

11. The steering drive system of claim 10, wherein at least one of:

the power unit is designed to slip-couple the first shaft to the power summation and/or power branching unit; or the power unit is designed to couple the first shaft to the second connection of the power summation and/or power branching unit.

12. The steering drive system of claim 1, wherein the reversing gear is one of:

integrated into the power summation and/or power branching unit; or connected between the coupling element and the power summation and/or power branching unit.

13. The steering drive system of claim 12, wherein:

the reversing gear is connected between the coupling element and the power summation and/or power branching unit and comprises at least two gear wheel tracks coupled to the coupling element;

a first gear wheel track is arranged to drive the coupling element through the power summation and/or power branching unit in a first direction of rotation in a first operating state of the reversing gear; and a second gear wheel track is arranged to drive the coupling element through the power summation and/or power branching unit in a second direction of rotation opposite to the first direction of rotation in a second operating state of the reversing gear.

14. The steering drive system of claim 1, wherein:

the power summation and/or power branching unit is configured to couple, in a first operating state, the first connection and the second connection to the third connection in at least one superimposed operation; and at least one of:

at least one of the first connection or the second connection is coupled to the third connection in at least one fixed transmission ratio mode in a second operating state, the first connection is coupled to the third connection in a fixed transmission ratio, or the first connection is coupled to the third connection in a fixed transmission ratio at least when the second connection is load-free.

15. The steering drive system of claim 14, wherein the power summation and/or power branching unit is designed to provide a mixed operation between the first and second operating states in a third operating state.

16. The steering drive system of claim 1, wherein the power summation and/or power branching unit comprises at least one of:

one or more planetary gear sets; or one or more switching elements.

17. The steering drive system of claim 16, further comprising a reversing gear configured to reverse a direction of rotation of the coupling element, wherein at least one of:

at least two planetary sets and at least two switching elements form the reversing gear integrated in the power summation and/or power branching unit;

at least two gear wheel tracks, to each of which at least one switching element, in particular a clutch, is coupled, form the reversing gear connected between the power summation and/or power branching unit and the coupling element; or at least two planetary sets and/or at least one switching element cooperate to provide different operating states of the power summation and/or power branching unit as a function of a switching position of the switching elements.

18. A wheel-side steered vehicle, comprising:

a traction drive system that includes at least one drive unit, a transmission, and a main power distribution unit; and a steering drive system according to claim 1;

wherein at least one of:

the first shaft of the steering drive system is coupled to the main power distribution unit, or the coupling element of the steering drive system is coupled to outputs of the vehicle.

19. The wheel-side steered vehicle of claim 18, wherein:

the traction drive system comprises a switchable clutch configured to couple the at least one drive unit to the main power distribution unit, and to uncouple the at least one drive unit from the main power distribution unit.

20. The wheel-side steered vehicle of claim 18, wherein:

the steering drive system includes at least one second electric machine coupled to the first shaft; and the traction drive system comprises at least one third electric machine arranged to support functions of the steering drive system provided by the at least one second electric machine.

* * * * *